(12) United States Patent
Daptardar et al.

(10) Patent No.: US 10,069,693 B1
(45) Date of Patent: Sep. 4, 2018

(54) DISTRIBUTED RESOURCE ALLOCATION

(71) Applicant: Amazon Technologies, Inc., Seattle, WA (US)

(72) Inventors: Aniruddha Shriram Daptardar, Redmond, WA (US); Aditya Subhash Jadhav, Seattle, WA (US); Jin Seop Kim, Seattle, WA (US); Douglas Cotton Kurtz, Sammamish, WA (US); Asem Rustum, Renton, WA (US); Christoph Saalfeld, Seattle, WA (US)

(73) Assignee: Amazon Technologies, Inc., Seattle, WA (US)

( * ) Notice: Subject to any disclaimer, the term of this patent is extended or adjusted under 35 U.S.C. 154(b) by 461 days.

(21) Appl. No.: 14/568,086

(22) Filed: Dec. 11, 2014

(51) Int. Cl.
*G06F 15/173* (2006.01)
*H04L 12/24* (2006.01)

(52) U.S. Cl.
CPC ...... *H04L 41/5054* (2013.01); *H04L 41/5029* (2013.01)

(58) Field of Classification Search
CPC . H04L 41/5054; H04L 41/5029; G06Q 10/06; G06Q 10/0631; G06Q 10/06314; G06Q 10/06316; G06Q 30/0283; G06F 2209/5017; G06F 2209/5011; G06F 2209/5018

USPC .......................................................... 709/226
See application file for complete search history.

(56) References Cited

U.S. PATENT DOCUMENTS

| 9,479,382 | B1 * | 10/2016 | Ward, Jr. .................. G06F 9/50 |
| 2004/0010592 | A1 * | 1/2004 | Carver .................... H04L 47/10 709/226 |
| 2015/0277979 | A1 * | 10/2015 | Chen ..................... G06F 9/5011 718/104 |

* cited by examiner

*Primary Examiner* — Larry Donaghue
*Assistant Examiner* — Patrick Ngankam
(74) *Attorney, Agent, or Firm* — Baker & Hostetler LLP

(57) ABSTRACT

In a computing environment, a request to fulfill a computational task and a constraint for fulfilling the computational task is received from an entity. The request is independent of the quantity or type of resource slot to fulfill the computation task. The quantity or type of resource slots sufficient to fulfill the request is determined in accordance with a constraint. The resource slots are associated with the entity and allocated a plurality of geographically separate computing environments. Master resource slots are allocated in the geographically separate computing environments based on the criterion and the quantity or type of resource slots. The master resource slots can be reallocated based on changes to the allocated resources slots.

20 Claims, 10 Drawing Sheets

FIG. 9

Management Console https://console.provider.com/

Create a New Request

Select an option below:

○ Classic Wizard

○ Quick Launch Wizard

● Batch Request Wizard
Bid for batch requests to run your distributed applications.

Batch Request Wizard

Name Your Batch Request: [Test Group ▼] — 906

Choose Your ID: [user1] [Browse]

Choose the Resource Type(s) compatible with your application. — 908

Resource Types: [All Resource Types ▼] [View/Edit]

Master/Slave Configuration:

Max Slaves per Master [500] [Master Config ▼] — 909

○ Cross Region   ● Use Template

Tell us your target compute capacity in the units of your choice, and what you're willing to bid: — 910

Total Desired Capacity: [100,000] [CUs ▼] [View/Edit] — 912

Max Bid Price per Unit-Hour: [$0.050] per CU

Avg price/unit-hr (low-high): $0.004 ($0.003-$0.010)
Avg On Demand/unit-hr: $0.056

Your Request's Current Price Range per Hour: $306.84 - $1,000.00
Maximum Potential Price per Hour: $5,000.00 — 914

[Submit] — 916

DISTRIBUTED RESOURCE ALLOCATION

BACKGROUND

A data center is a facility that houses computer systems and various networking, storage and other related components. Data centers may, for example, provide computing services to businesses and individuals as a remote computing service or provide "software as a service" (e.g., cloud computing). To facilitate utilization of data center resources, virtualization technologies may allow a single physical computing machine to host one or more instances of virtual machines that appear and operate as independent computer machines to a connected computer user. With virtualization, the single physical computing device can create, maintain, or delete virtual machines in a dynamic manner.

Some virtualization technologies are capable of providing virtual resources that span two or more physical resources, such as a single virtual machine with multiple virtual processors that span multiple distinct physical computing systems. As another example, virtualization technologies may allow data storage hardware to be shared among multiple users by providing each user with a virtualized data store that may be distributed across multiple data storage devices, with each such virtualized data store acting as a distinct logical data store that provides users with the illusion that they are the sole operators and administrators of the data storage resource.

In many environments, operators of data centers that implement different types of virtualized computing, storage, and/or other network-accessible resources may allow customers to reserve or purchase access to resources in various resource acquisition modes. The computing resources provided by the computing resource provider may be made available in discrete units, which may be referred to as instances. An instance may represent a physical server hardware platform, a virtual machine instance executing on a server, or some combination of the two. Various types and configurations of instances may be made available, including different sizes of resources executing different operating systems (OS) and/or hypervisors, and with various installed software applications, runtimes, and the like.

In many environments, operators of data centers that implement different types of virtualized computing, storage, and/or other network-accessible functionality allow customers to reserve or purchase access to resources in any of several different resource acquisition modes. For example, a customer may reserve a virtual resource instance for a relatively long duration, such as one year or three years, or a customer may purchase resources for shorter terms on an ad-hoc basis as needed. For some types of resource reservations, at least a portion of the price paid by the customer may fluctuate over time in response to the changing demand and supply of the resources within the provider network.

BRIEF DESCRIPTION OF DRAWINGS

Throughout the drawings, reference numbers may be reused to indicate correspondence between referenced elements. The drawings are provided to illustrate example embodiments described herein and are not intended to limit the scope of the disclosure:

FIG. 9 is a diagram illustrating an example user interface in accordance with the present disclosure.

DETAILED DESCRIPTION

Figure 1:
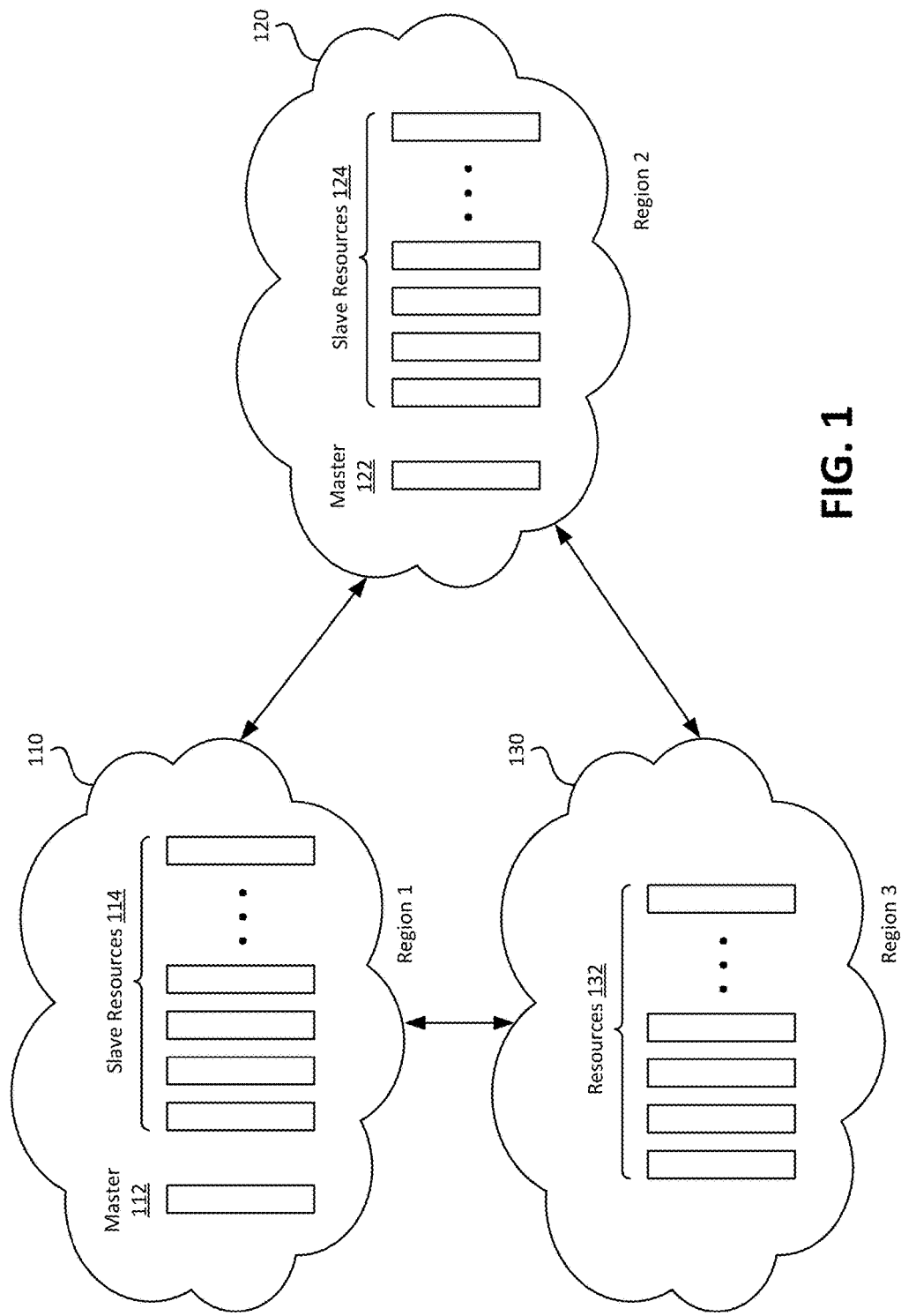
FIG. 1 is a diagram illustrating a mechanism for allocating resources in accordance with the present disclosure.

Embodiments of systems and methods are described for providing, by a provider network, such as a data center, computing resources such as virtual instances based on dynamically varying pricing for the computing resources. For example, a virtual instance requested by a customer of the data center may be associated with a price that the customer may wish to pay for the virtual instance. The actual price charged by the data center for the computing resource may vary based on factors such as current market demand for the computing resource and the amount of excess computing capacity available for variably priced computing resources. The computing resource may be provided to the customer during periods of time in which the actual price for the computing resource is commensurate with the price that the customer desires to pay. During periods of time in which the actual price for the computing resource exceeds the price that the customer wishes to pay, the computing resource may be reallocated to another customer who is willing to pay the actual price.

In addition to a type of instance, the customer may be allowed to specify a particular configuration for the instance, such as size, platform, tenancy, availability zone, and the like. In many cases, the customer may estimate the numbers and configurations of instances and instance types to best suit the customer's needs according to the technical specifications of the instances and instance types. However, not all customers may have sufficient information or experience to accurately or efficiently estimate the numbers and configurations of instances that are required to cost-effectively meet their needs.

In various embodiments described further in this disclosure, customers may be provided with the ability to submit a request or bid for instances without specifying a particular quantity of instances or the configurations of the instances. For example, the request or bid may include a desired computing capability, such as a number of compute or computing units (as used herein, "compute units" and "computing units" may be used interchangeably). The request or bid may additionally or alternatively describe a task that requires computing resources, such as a distributed computing task. The request or bid may also include a desired pricing level that the customer is willing to pay to fulfill the request or bid. Customers may provide other parameters to further describe the customer's computing needs and to further optimize fulfillment of the request or bid. In this way, a customer need not analyze the customer's computing needs in terms of specific technical characteristics or configurations of the provider network's instances and identify a particular configuration or quantity of instance when making a request or bid.

In some embodiments, it would be advantageous to allocate resources across different data centers that may be located in different geographic regions. However, many distributed computing tasks require communication between allocated resources, and the requirements for communication latencies between resources can vary. In some cases the latencies may be unacceptable for some customers, and for such customers, the provider network may not be able to provide resources across different regions. In other cases, a customer's resources may be relatively independent and such a customer may not have any restrictions regarding the physical location of the customer's resources. In such cases, the provider network may efficiently allocate resources and may be able to provide additional cost benefits due to such flexibility.

In some cases, customers may be allocated resources across multiple regions, with one or more master resources acting as coordination and management resources for other resources, including those that are configured as slave resources. When resources are allocated to regions without a master resource, one may be initiated depending on the nature of the distributed tasks and customer requirements. Master and slave resources may have different configurations. For example, a master resource may include database capabilities with a high IOPS and levels of memory. Slave resources may, for example, be configured to have processing capabilities but not IOPS and memory.

When the provider network is attempting to fulfill a customer's bid across multiple regions, in some cases the customer's bid may be fulfilled using the master-slave configuration. Depending on the specific configuration, the need to transfer data between regions may result in increased costs and delays. For example, a master may be configured to manage the operation of slave resources in multiple regions, resulting in the need for large amounts of data transfers between the regions. As another example, resources split across different regions that are operating on the same parallel task and sharing data may be impacted by the additional data transfer cost between the regions as well as the increased latency for inter-instance transactions or accessing data storage located different regions.

In various embodiments, a resource distribution framework is disclosed that analyzes customer allocations of computing resources and automatically configures master resources as needed to maintain customer cost and performance constraints while reducing costs due to data transfer and data latency. For example, the resource distribution framework may configure and launch master computing instances in a region to manage the slave resources running in the region. In one embodiment, customers of the provider network can bid for instances and configure the instances for executing distributed tasks. The customer may further select or specify a configuration that can be used to launch a configured number of master instances. In some embodiments, customized storage configurations for each region may be specified for instances that are launched in each region. A master instance can be a transient instance, reserved instance, or on-demand instance.

For example, FIG. 1 illustrates an example implementation of a resource distribution framework. FIG. 1 illustrates regions 110, 120, and 130 that include various computing resources. Region 120 includes slave resources 124 and a master resource 122. Region 130 includes resources 132 but does not include a master resource. The resources may be allocated for a customer of a provider network (not shown). The resources may be allocated in regions associated with computing resources of the provider network. However, in some cases, one or more of the resources may be located on the customer's premises. The present disclosure describes a resource distribution framework that is configured to analyze allocations of computing resources and automatically configure master resources as needed to maintain customer cost and performance constraints while reducing costs due to data transfer and data latency between the regions. For example, the resource distribution framework may configure and launch master computing resource 112 in region 110 and master computing resource 122 in region 120 to manage the slave resources running in the regions. Furthermore, in this example, the resource distribution framework may determine that based on the customer cost and performance constraints, a master resource is not needed in region 130.

In some embodiments, it may be advantageous to have one or more master instances in the same region where new transient instances are launched in to provide low latency and low cost network traffic for the slave transient instances in the region. The resource distribution framework may distribute new transient instances so as to have a master/slave ratio that generates less cross-region data communications dependencies.

In one embodiment, a resource distribution framework may be provided that is configured to allocate slave resources for the lowest available cost for a given region. In this case, a master resource may be required for that region. If slave resources are available in a region and a master resource is not running or available, a new master resource can be initiated. The resource distribution framework may be configured to automatically analyze the placement of resources based on the customer's requirements and determine the placement of master resources based on the fulfillment of slave resources. The resource distribution framework may also automatically determine the placement of different resource type configurations for master and slave resources.

Figure 2:
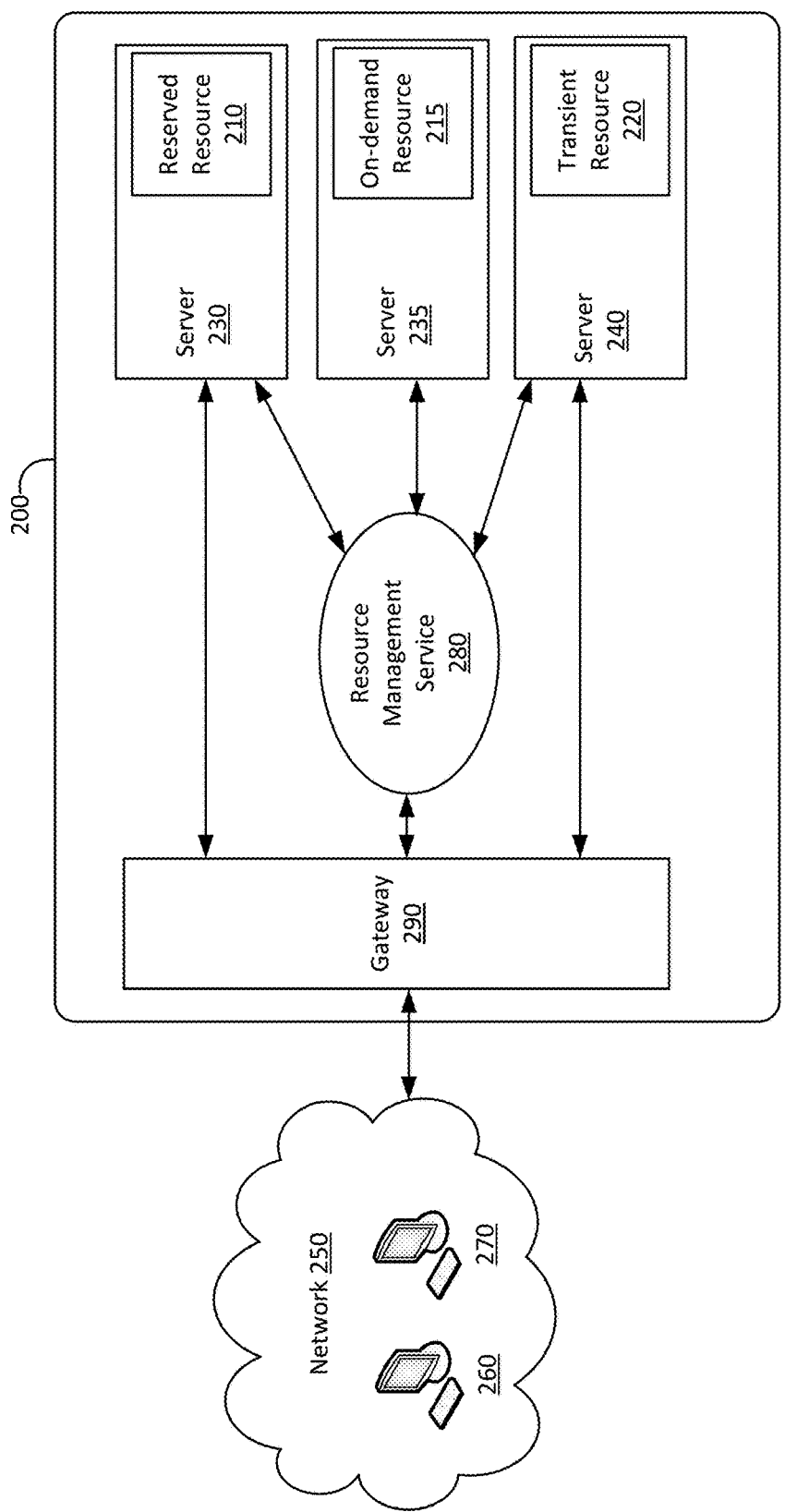
FIG. 2 is a diagram illustrating a mechanism for allocating resources in accordance with the present disclosure.

FIG. 2 is a diagram illustrating a system 200 including a framework for managing resources in accordance with the present disclosure. In FIG. 2, system 200 may include a reserved resource 210, an on-demand resource 215, and a transient resource 220 that may execute, for example, on one or more server computers 230, 235 and 240, respectively. It will be appreciated that some embodiments may involve additional resources of various types that may be instantiated on additional server computers.

FIG. 2 also illustrates a public network 250 that may include one or more computers, such as computers 260 and 270. According to one embodiment, resources 210, 215 and 220 may be configured to provide computing services to a computer user (not shown) of public network 250 via gateway 290 and computers 260 and 270. For example, reserved resource 210 may provide a set of remote access enterprise applications to a group of users who may, for example, be employees of an enterprise customer. The resources may be implemented as virtual machine instances, storage resources, and other types of computing resources.

A user at computer 260 or 270 may send a request to a resource management service 280 for analyzing and managing the fulfillment of requests. In some embodiments, a request may be received directly from the user at computer 260 or 270. In response to receipt of a request, resource management service 280 may log the request and provide updates as to the status of the request. The resource management service 280 may communicate with other services to facilitate: (1) processing of the request, (2) bidding for resources to fulfill the request, and (3) allocation of resources necessary to fulfill the request. The resource management service 280 may, for example, provide an interface for facilitating submission of the request. The resource management service 280 may further provide an interface for viewing the status of the request and modifying or cancelling the request.

Various aspects of the disclosure are now described with regard to certain examples and embodiments, which are intended to illustrate but not to limit the disclosure. It should be appreciated that the subject matter presented herein may be implemented as a computer process, a computer-controlled apparatus or a computing system, or an article of manufacture, such as a computer-readable storage medium. While the subject matter described herein is presented in the general context of program modules that execute on one or more computing devices, those skilled in the art will recognize that other implementations may be performed in combination with other types of program modules. Generally, program modules include routines, programs, components, data structures, and other types of structures that perform particular tasks or implement particular abstract data types.

Those skilled in the art will also appreciate that the subject matter described herein may be practiced on or in conjunction with other computer system configurations beyond those described herein, including multiprocessor systems, microprocessor-based or programmable consumer electronics, minicomputers, mainframe computers, handheld computers, personal digital assistants, e-readers, cellular telephone devices, special-purposed hardware devices, network appliances, and the like. The embodiments described herein may also be practiced in distributed computing environments, where tasks are performed by remote processing devices that are linked through a communications network. In a distributed computing environment, program modules may be located in both local and remote memory storage devices.

In the following detailed description, references are made to the accompanying drawings that form a part hereof, and that show, by way of illustration, specific embodiments or examples. The drawings herein are not drawn to scale. Like numerals represent like elements throughout the several figures.

Networks established by or on behalf of an entity, such as a company or organization, to provide one or more services (such as various types of cloud-based computing or storage) accessible via the Internet and/or other networks to a distributed set of clients may be termed provider networks. Such a provider network may include one or more data centers hosting various resource pools, such as collections of physical and/or virtualized computer servers, storage devices, networking equipment, and the like, that may be used to implement and distribute the infrastructure and services offered by the provider network. The resources may, in some embodiments, be offered to clients in units called "instances," such as virtual or physical compute instances or storage instances. A virtual computing instance may, for example, comprise one or more servers with a specified computational capacity (which may be specified by indicating the type and number of CPUs, the main memory size and so on) and a specified software stack (e.g., a particular version of an operating system, which may in turn run on top of a hypervisor).

A number of different types of computing devices may be used singly or in combination to implement the resources of the provider network in different embodiments, including general-purpose or special-purpose computer servers, storage devices, network devices, and the like. In some embodiments, a client or user may be provided direct access to a resource instance, e.g., by giving a user an administrator login and password. In other embodiments, the provider network operator may allow clients to specify execution requirements for specified client applications and schedule execution of the applications on behalf of the client on execution platforms (such as application server instances, Java™ virtual machines (JVMs), general purpose or special purpose operating systems, platforms that support various interpreted or compiled programming languages, such as Ruby, Perl, Python, C, C++, and the like, or high-performance computing platforms) suitable for the applications. This may be done without, for example, requiring the client to access an instance or an execution platform directly. A given execution platform may utilize one or more resource instances in some implementations; in other implementations, multiple execution platforms may be mapped to a single resource instance.

Figure 3:
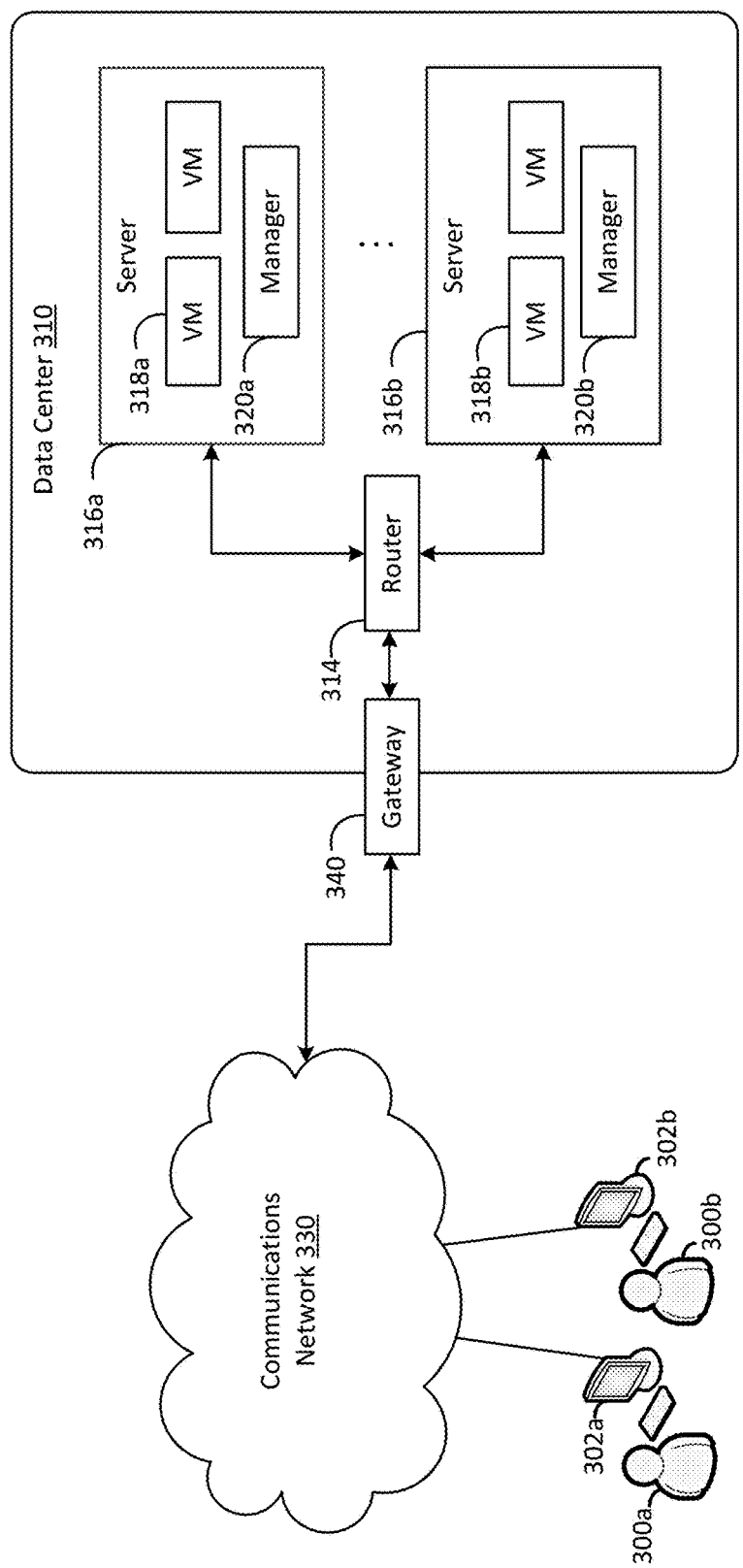
FIG. 3 is a diagram illustrating an example computing system that may be used in some embodiments.

FIG. 3 illustrates an example computing environment in which the embodiments described herein may be implemented. FIG. 3 is a diagram schematically illustrating an example of a data center 310 that can provide computing resources to users 300*a* and 300*b* (which may be referred herein singularly as "a user 300" or in the plural as "the users 300") via user computers 302*a* and 302*b* (which may be referred herein singularly as "a computer 302" or in the plural as "the computers 302") via a communications network 330. Data center 310 may be configured to provide computing resources for executing applications on a permanent or an as-needed basis. The computing resources provided by data center 310 may include various types of resources, such as data processing resources, data storage resources, data communication resources, and the like. Each type of computing resource may be general-purpose or may be available in a number of specific configurations. For example, data processing resources may be available as virtual machine instances. The instances may be configured to execute applications, including web servers, application servers, media servers, database servers, and the like. Data storage resources may include file storage devices, block storage devices and the like.

Each type or configuration of computing resource may be available in different sizes, such as large resources, consisting of many processors, large amounts of memory, and/or large storage capacity, and small resources consisting of fewer processors, smaller amounts of memory, and/or smaller storage capacity. Customers may choose to allocate a number of small processing resources as web servers and/or one large processing resource as a database server, for example.

Data center 310 may include servers 316*a* and 316*b* (which may be referred herein singularly as "a server 316" or in the plural as "the servers 316") that provide computing resources available as virtual machine instances 318*a* and 318*b* (which may be referred herein singularly as "a virtual machine instance 318" or in the plural as "the virtual machine instances 318"). The virtual machine instances 318 may be configured to execute applications, including web servers, application servers, media servers, database servers, and the like. Other resources that may be provided include data storage resources (not shown) and may include file storage devices, block storage devices, and the like.

The availability of virtualization technologies for computing hardware has provided benefits for providing large scale computing resources for customers and allowing computing resources to be efficiently and securely shared between multiple customers. For example, virtualization technologies such as those provided by VMware or other virtualization systems may allow a physical computing device to be shared among multiple users by providing each user with one or more virtual machine instances hosted by the physical computing device. A virtual machine instance may be a software emulation of a particular physical computing system that acts as a distinct logical computing system. Such a virtual machine instance provides isolation among multiple operating systems sharing a given physical computing resource. Furthermore, some virtualization technologies may provide virtual resources that span one or more physical resources, such as a single virtual machine instance with multiple virtual processors that spans multiple distinct physical computing systems.

Referring to FIG. 3, communications network 330 may, for example, be a publicly accessible network of linked networks and possibly operated by various distinct parties, such as the Internet. In other embodiments, communications network 330 may be a private network, such as, for example, a corporate or university network that is wholly or partially inaccessible to non-privileged users. In still other embodiments, communications network 330 may include one or more private networks with access to and/or from the Internet.

Communications network 330 may provide access to computers 302. Computers 302 may be computers utilized by users 300 or other users of data center 310. For instance, user computer 302a or 302b may be a server, a desktop or laptop personal computer, a tablet computer, a wireless telephone, a personal digital assistant (PDA), an e-book reader, a game console, a set-top box, or any other computing device capable of accessing data center 310. User computer 302a or 302b may connect directly to the Internet (e.g., via a cable modem or a Digital Subscriber Line (DSL)). Although only two user computers 302a and 302b are depicted, it should be appreciated that there may be multiple user computers.

Computers 302 may also be utilized to configure aspects of the computing resources provided by data center 310. In this regard, data center 310 might provide a web interface through which aspects of its operation may be configured through the use of a web browser application program executing on user computer 302. Alternatively, a stand-alone application program executing on user computer 302 might access an application programming interface (API) exposed by data center 310 for performing the configuration operations. Other mechanisms for configuring the operation of the data center 310, including deploying updates to an application, might also be utilized.

Servers 316a and 316b shown in FIG. 3 may be standard servers configured appropriately for providing the computing resources described above and may provide computing resources for executing one or more applications. In one embodiment, the computing resources may be virtual machine instances 318. In the example of virtual machine instances, each of the servers 316 may be configured to execute an instance manager 320a or 320b (which may be referred herein singularly as "an instance manager 320" or in the plural as "the instance managers 320") capable of executing the virtual machine instances. The instance managers 320 may be a virtual machine monitor (VMM) or another type of program configured to enable the execution of virtual machine instances 318 on servers 316, for example. As discussed above, each of the virtual machine instances 318 may be configured to execute all or a portion of an application.

It should be appreciated that although the embodiments disclosed above discuss the context of virtual machine instances, other types of implementations can be utilized with the concepts and technologies disclosed herein. For example, the embodiments disclosed herein might also be utilized with computing systems that do not utilize virtual machine instances.

In the example data center 310 shown in FIG. 3, a router 314 may be utilized to interconnect the servers 316a and 316b. Router 314 may also be connected to gateway 340, which may be connected to communications network 330. Router 314 may manage communications within networks in data center 310, for example, by forwarding packets or other data communications as appropriate based on characteristics of such communications (e.g., header information including source and/or destination addresses, protocol identifiers, etc.) and/or the characteristics of the private network (e.g., routes based on network topology, etc.). It will be appreciated that, for the sake of simplicity, various aspects of the computing systems and other devices of this example are illustrated without showing certain conventional details. Additional computing systems and other devices may be interconnected in other embodiments and may be interconnected in different ways.

It should be appreciated that the network topology illustrated in FIG. 3 has been greatly simplified and that many more networks and networking devices may be utilized to interconnect the various computing systems disclosed herein. These network topologies and devices should be apparent to those skilled in the art.

It should also be appreciated that data center 310 described in FIG. 3 is merely illustrative and that other implementations might be utilized. Additionally, it should be appreciated that the functionality disclosed herein might be implemented in software, hardware, or a combination of software and hardware. Other implementations should be apparent to those skilled in the art. It should also be appreciated that a server, gateway, or other computing device may comprise any combination of hardware or software that can interact and perform the described types of functionality, including without limitation desktop or other computers, database servers, network storage devices and other network devices, PDAs, tablets, cellphones, wireless phones, pagers, electronic organizers, Internet appliances, television-based systems (e.g., using set top boxes and/or personal/digital video recorders), and various other consumer products that include appropriate communication capabilities. In addition, the functionality provided by the illustrated modules may in some embodiments be combined in fewer modules or distributed in additional modules. Similarly, in some embodiments the functionality of some of the illustrated modules may not be provided and/or other additional functionality may be available.

The capacity of purchased computing resources provided by data center 310 can be scaled in response to demand. In this regard, scaling refers to the process of instantiating (which may also be referred to herein as "launching" or "creating") or terminating (which may also be referred to herein as "de-scaling") instances of computing resources in response to demand. In this manner, the capacity of resources purchased by a user of data center 310 can be scaled on-demand.

Auto scaling is one mechanism for scaling computing resources in response to increases or lulls in demand for the resources. Auto scaling allows users of data center 310 to configure data center 310 to scale their purchased computing resources according to conditions defined by the user. For instance, rules may be defined for scaling up capacity in a particular manner in response to the occurrence of specified conditions, such as a spike in demand. Similarly, rules might also be defined to scale down capacity in a particular manner in response to the occurrence of other conditions, such as a lull in demand. The mechanisms disclosed herein for launching virtual machine instances might be utilized when instances are manually launched by a user or when instances are launched by an auto scaling component in data center 310.

Data center 310 may also be configured with a deployment component to assist users in the deployment of new instances of computing resources. The deployment component may receive a configuration from a user that includes data describing how new instances should be configured. For example, the configuration might specify one or more applications or software components that should be installed in new instances, provide scripts and/or other types of code to be executed in new instances, provide cache warming logic specifying how an application cache should be prepared, and other types of information. The deployment component utilizes the user-provided configuration and cache warming logic to launch, configure, and prime new instances of computing resources.

Figure 4:
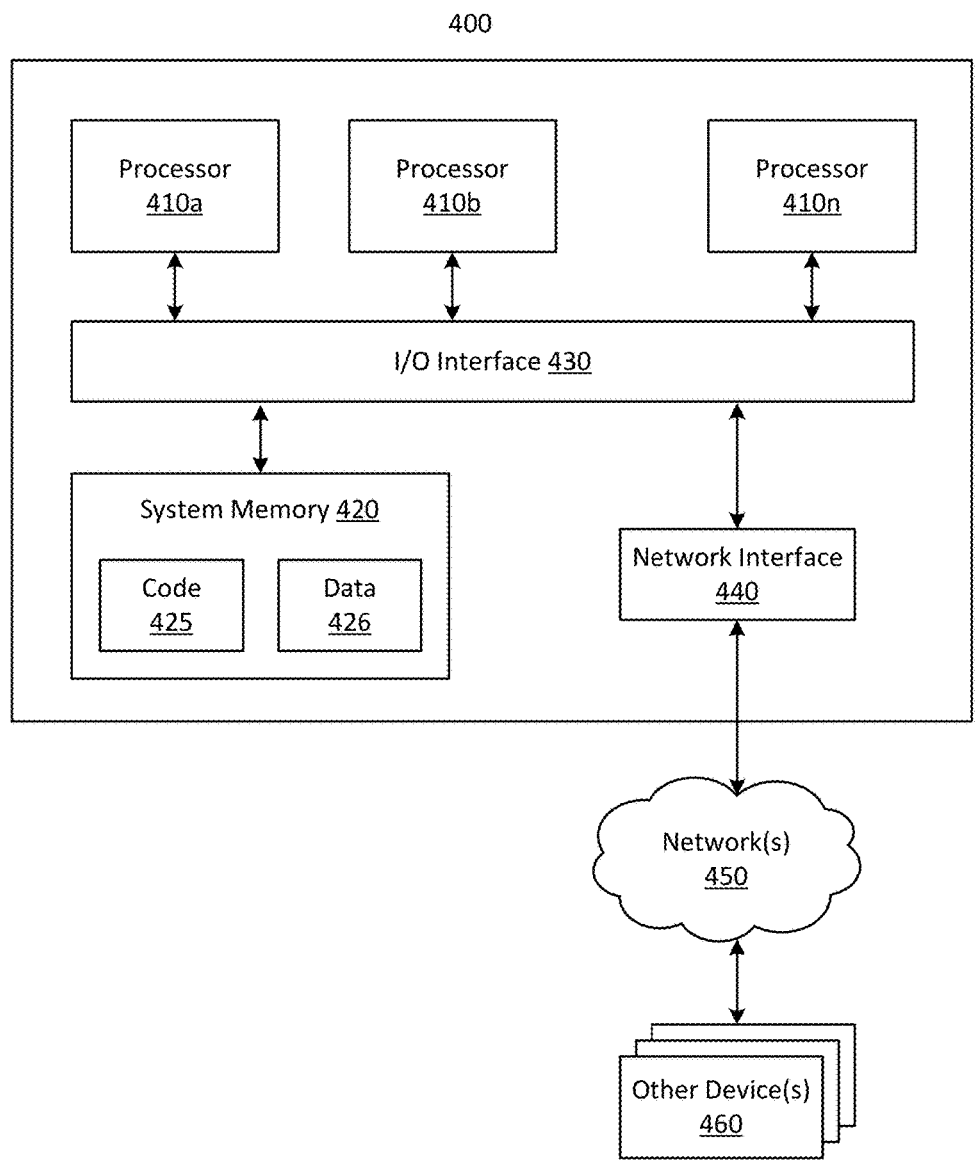
FIG. 4 is a diagram illustrating a system for allocating resources in accordance with the present disclosure.

In at least some embodiments, a server that implements a portion or all of one or more of the technologies described herein, including the techniques to implement the functionality of a resource management service 280 may include a general-purpose computer system that includes or is configured to access one or more computer-accessible media. FIG. 4 illustrates such a general-purpose computing device 400. In the illustrated embodiment, computing device 400 includes one or more processors 410a, 410b, and/or 410n (which may be referred herein singularly as "a processor 410" or in the plural as "the processors 410") coupled to a system memory 420 via an input/output (I/O) interface 430. Computing device 400 further includes a network interface 440 coupled to I/O interface 430.

In various embodiments, computing device 400 may be a uniprocessor system including one processor 410 or a multiprocessor system including several processors 410 (e.g., two, four, eight, or another suitable number). Processors 410 may be any suitable processors capable of executing instructions. For example, in various embodiments, processors 410 may be general-purpose or embedded processors implementing any of a variety of instruction set architectures (ISAs), such as the x86, PowerPC, SPARC, or MIPS ISAs or any other suitable ISA. In multiprocessor systems, each of processors 410 may commonly, but not necessarily, implement the same ISA.

System memory 420 may be configured to store instructions and data accessible by processor(s) 410. In various embodiments, system memory 420 may be implemented using any suitable memory technology, such as static random access memory (SRAM), synchronous dynamic RAM (SDRAM), nonvolatile/Flash-type memory, or any other type of memory. In the illustrated embodiment, program instructions and data implementing one or more desired functions, such as those methods, techniques, and data described above, are shown stored within system memory 420 as code 425 and data 426.

In one embodiment, I/O interface 440 may be configured to coordinate I/O traffic between processor 410, system memory 420, and any peripheral devices in the device, including network interface 430 or other peripheral interfaces. In some embodiments, I/O interface 430 may perform any necessary protocol, timing, or other data transformations to convert data signals from one component (e.g., system memory 420) into a format suitable for use by another component (e.g., processor 410). In some embodiments, I/O interface 430 may include support for devices attached through various types of peripheral buses, such as a variant of the Peripheral Component Interconnect (PCI) bus standard or the Universal Serial Bus (USB) standard, for example. In some embodiments, the function of I/O interface 430 may be split into two or more separate components, such as a north bridge and a south bridge, for example. Also, in some embodiments some or all of the functionality of I/O interface 430, such as an interface to system memory 420, may be incorporated directly into processor 410.

Network interface 440 may be configured to allow data to be exchanged between computing device 400 and other device or devices 460 attached to a network or networks 450, such as other computer systems or devices as illustrated in FIGS. 1 through 3, for example. In various embodiments, network interface 440 may support communication via any suitable wired or wireless general data networks, such as types of Ethernet networks, for example. Additionally, network interface 440 may support communication via telecommunications/telephony networks, such as analog voice networks or digital fiber communications networks, via storage area networks, such as Fibre Channel SANs, or via any other suitable type of network and/or protocol.

In some embodiments, system memory 420 may be one embodiment of a computer-accessible medium configured to store program instructions and data as described above for FIGS. 1 and 2 for implementing embodiments of the corresponding methods and apparatus. However, in other embodiments, program instructions and/or data may be received, sent, or stored upon different types of computer-accessible media. Generally speaking, a computer-accessible medium may include non-transitory storage media or memory media, such as magnetic or optical media, e.g., disk or DVD/CD coupled to computing device 400 via I/O interface 430. A non-transitory computer-accessible storage medium may also include any volatile or non-volatile media such as RAM (e.g., SDRAM, DDR SDRAM, RDRAM, SRAM, etc.), ROM, etc., that may be included in some embodiments of computing device 400 as system memory 420 or another type of memory. Further, a computer-accessible medium may include transmission media or signals such as electrical, electromagnetic, or digital signals, conveyed via a communication medium, such as a network and/or a wireless link, such as may be implemented via network interface 440. Portions or all of multiple computing devices such as those illustrated in FIG. 4 may be used to implement the described functionality in various embodiments; for example, software components running on a variety of different devices and servers may collaborate to provide the functionality. In some embodiments, portions of the described functionality may be implemented using storage devices, network devices, or special-purpose computer systems, in addition to or instead of being implemented using general-purpose computer systems. The term "computing device," as used herein, refers to at least all these types of devices and is not limited to these types of devices.

A network set up by an entity, such as a company or a public sector organization, to provide one or more services (such as various types of cloud-based computing or storage) accessible via the Internet and/or other networks to a distributed set of clients may be termed a provider network.

Such a provider network may include numerous data centers hosting various resource pools, such as collections of physical and/or virtualized computer servers, storage devices, networking equipment, and the like, needed to implement and distribute the infrastructure and services offered by the provider network. The resources may, in some embodiments, be offered to clients in units called instances, such as virtual or physical computing instances or storage instances. A virtual computing instance may, for example, comprise one or more servers with a specified computational capacity (which may be specified by indicating the type and number of CPUs, the main memory size, and so on) and a specified software stack (e.g., a particular version of an operating system, which may in turn run on top of a hypervisor).

A number of different types of computing devices may be used singly or in combination to implement the resources of the provider network in different embodiments, including general-purpose or special-purpose computer servers, storage devices, network devices, and the like. In some embodiments a client or user may be provided direct access to a resource instance, e.g., by giving a user an administrator login and password. In other embodiments, the provider network operator may allow clients to specify execution requirements for specified client applications and schedule execution of the applications on behalf of the client on execution platforms (such as application server instances, Java™ virtual machines (JVMs), general-purpose or special-purpose operating systems, platforms that support various interpreted or compiled programming languages, such as Ruby, Perl, Python, C, C++, and the like, or high-performance computing platforms) suitable for the applications, without, for example, requiring the client to access an instance or an execution platform directly. A given execution platform may utilize one or more resource instances in some implementations; in other implementations multiple execution platforms may be mapped to a single resource instance.

In many environments, operators of provider networks that implement different types of virtualized computing, storage, and/or other network-accessible functionality may allow customers to reserve or purchase access to resources in various resource acquisition modes. The computing resource provider may provide facilities for customers to select and launch the desired computing resources, deploy application components to the computing resources, and maintain an application executing in the environment. In addition, the computing resource provider may provide further facilities for the customer to quickly and easily scale up or scale down the numbers and types of resources allocated to the application, either manually or through automatic scaling, as demand for or capacity requirements of the application change. The computing resources provided by the computing resource provider may be made available in discrete units, which may be referred to as instances. An instance may represent a physical server hardware platform, a virtual machine instance executing on a server or some combination of the two. Various types and configurations of instances may be made available, including different sizes of resources executing different operating systems (OS) and/or hypervisors and with various installed software applications, runtimes, and the like. Instances may further be available in specific availability zones, representing a data center or other geographic location of the underlying computing hardware, for example.

In some embodiments the provider network may be organized into a plurality of geographical regions, and each region may include one or more availability zones. An availability zone (which may also be referred to as an availability container) in turn may comprise one or more distinct locations or data centers, configured in such a way that the resources in a given availability zone may be isolated or insulated from failures in other availability zones. That is, a failure in one availability zone may not be expected to result in a failure in any other availability zone. Thus, the availability profile of a resource instance is intended to be independent of the availability profile of a resource instance in a different availability zone. Users may be able to protect their applications from failures at a single location by launching multiple application instances in respective availability zones. At the same time, in some implementations, inexpensive and low latency network connectivity may be provided between resource instances that reside within the same geographical region (and network transmissions between resources of the same availability zone may be even faster).

The provider network may make instances available "on-demand," allowing a customer to select a number of instances of a specific type and configuration (e.g. size, platform, tenancy, availability zone, and the like) and quickly launch the instances for deployment. On-demand instances may further be added or removed as needed, either manually or automatically through auto scaling, as demand for or capacity requirements changes over time. The customer may incur ongoing usage costs related to their on-demand instances, based on the number of hours of operation and/or the actual resources utilized, for example.

The computing resource provider may also make reserved instances available to the user. Reserved instances may provide the customer with the ability to reserve a number of a specific type and configuration of instances for a fixed term, such as one year or three years, for a low, upfront cost in exchange for reduced hourly or other usage costs, for example, if and when the instances are launched. This may allow the user to defer costs related to scaling up the deployed application in response to increase in demand, while ensuring that the right resources will be available when needed. While reserved instances provide users with reliable, stand-by capacity for scaling of their application, purchasing reserved instances may also lock the user into a specific number, type, and/or configuration of computing resource in a specific availability zone for a longer period than desired. If the technical architecture or needs of the application change, the user may not be able to realize a return on the user's investment in the reserved instances.

Operators of such provider networks may in some instances implement a flexible set of resource reservation, control, and access interfaces for their clients. For example, a resource manager of the provider network may implement a programmatic resource reservation interface (e.g., via a web site or a set of web pages) that allows users to learn about, select, purchase access to, and/or reserve resource instances. In some embodiments discussed below where an entity, such as a resource manager or a pricing optimizer, is described as implementing one or more programmatic interfaces such as a web page or an API, an interface manager subcomponent of that entity may be responsible for the interface-related functionality. In many embodiments, equivalent interface-related functionality may be implemented by a separate or standalone interface manager, external to the resource manager and the pricing optimizer. Such an interface may include capabilities to allow browsing of a resource catalog, provide details and specifications of the different types or sizes of resources supported, the different reservation types or modes supported, pricing models, and so on.

The provider network may support several different purchasing modes (which may also be referred to herein as reservation modes) corresponding to some of the instance types described above. For example, the provider network may support reserved reservations, on-demand resource allocations, or transient-price-based resource allocations. Using the reserved reservation mode, a client may make a low, one-time, upfront payment for a resource instance, reserve it for a specified duration, such as a one- or three-year term, and pay a low hourly rate for the instance; the client would be assured of having the reserved instance available for the term of the reservation. Using the on-demand mode, a user could pay for capacity by the hour (or some appropriate time unit), without any long-term commitments or upfront payments. In the transient-price mode, a user could specify the maximum price per unit of time that the user is willing to pay for a particular type of resource, and if the user's maximum price exceeded a dynamic transient price determined at least in part by supply and demand, then that type of resource would be provided to the user. In some embodiments, dynamically resizable pools of resource instances may be set aside for the different reservation types or modes—e.g., long-term reserved instances may be allocated from one pool, on-demand instances from another, and so on. During periods when the supply of the requested resource type exceeded the demand, the transient price may become significantly lower than the price for the on-demand mode. In some implementations, if the transient price increases beyond the maximum bid specified by a user, a resource allocation may be interrupted—i.e., a resource instance that was previously allocated to the user may be reclaimed by the resource manager and may be allocated to some other user that is willing to pay a higher price. Other purchasing modes or combinations of modes may be implemented by the resource manager in some embodiments.

Figure 5:
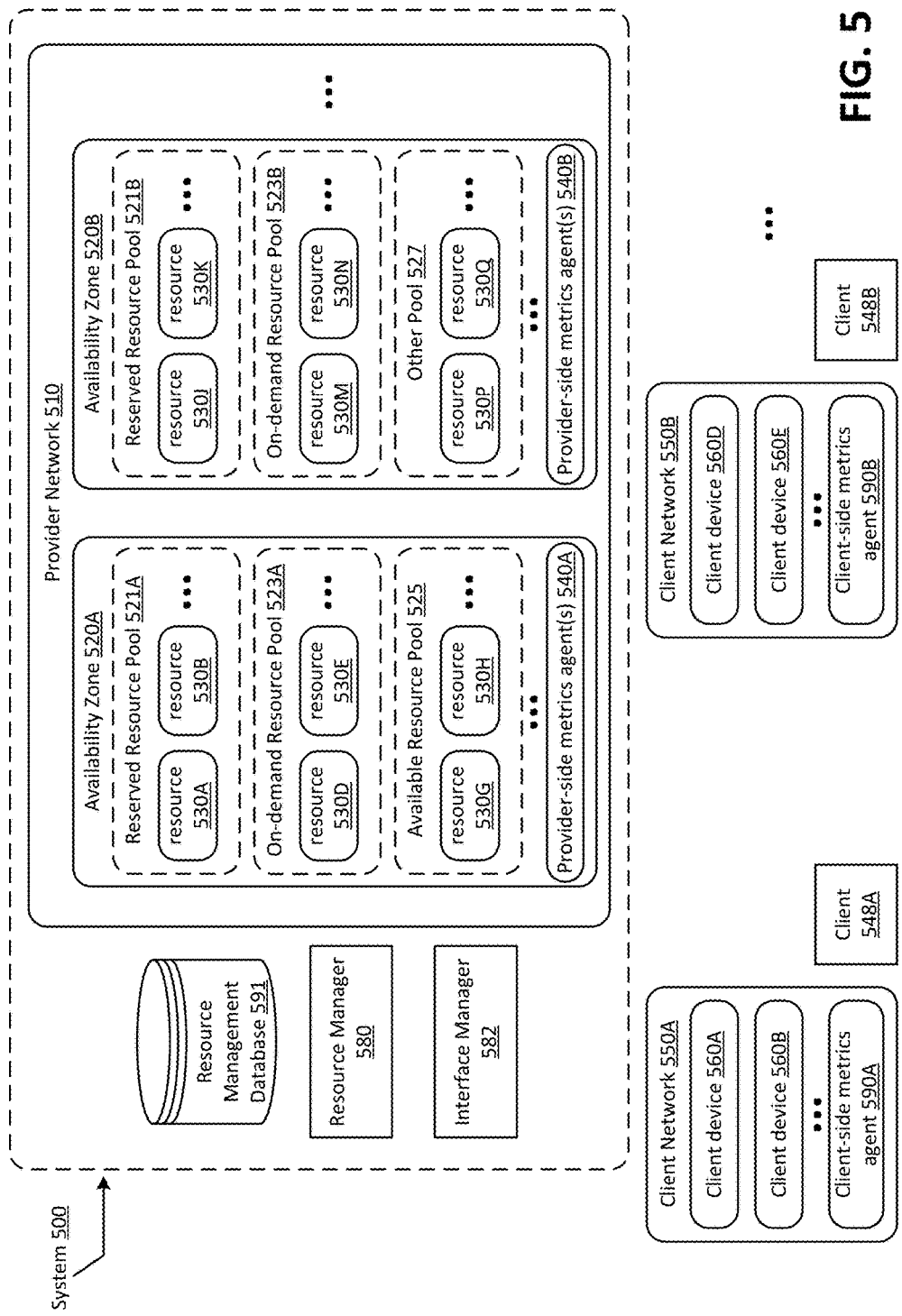
FIG. 5 is a diagram illustrating a mechanism for allocating resources in accordance with the present disclosure.

FIG. 5 illustrates an example system environment for providing resources, according to at least some embodiments. The system 500 may include a provider network 510 comprising a plurality of resources 530 (which may be referred herein singularly as "a resource 530" or in the plural as "the resources 530"), such as resources 530A, 530B, 530D, 530E, 530G, and 530H in one availability zone 520A and resources 530J, 530K, 530M, 530N, 530P and 530Q in a different availability zone 520B. The various resources 530 in the availability zones 520A and 520B (which may be referred herein singularly as "an availability zone 520" or in the plural as "the availability zones 520") may be reserved and/or allocated for use by clients (or potential clients) such as client 548A and 548B (which may be referred herein singularly as "a client 548" or in the plural as "the clients 548"). In the illustrated embodiment, system 500 includes a resource manager 580 and an interface manager 582. As noted earlier, in some embodiments, the functionality of the interface manager 582 may be implemented by a subcomponent of the resource manager 580.

The interface manager 582 may, in some embodiments, implement one or more programmatic interfaces allowing clients 548 to search for, browse, reserve, and acquire resources 530 to obtain various types of services, e.g., to run and/or access various applications. In the illustrated embodiment, at a given point in time, some or all of the resources 530 may be assigned to resource pools, such as reserved resource pools 521A or 521B, on-demand resource pools 523A or 523B, available resource pool 525, or other pools, such as other pool 527.

In some embodiments a given pool, such as available resource pool 525, may itself contain its own sub-pools, e.g., based on the modes of resource reservation and allocation supported. Each pool (or sub-pool) may have an associated pricing policy for its resources, as well as other properties, such as interruptibility settings, for the resources that happen to be assigned to the pool or sub-pool. The pools may represent logical collections or aggregations, so that, for example, the presence of two resources in the same pool or sub-pool may not necessarily imply anything about the physical location of the hardware used for the two resources. Although the resources 530 illustrated in FIG. 5 are shown as belonging to availability zones 520, in other embodiments the provider network 510 may be organized differently, e.g., in some embodiments availability zones 520 may not be implemented. Availability zones 520 may be grouped into geographic regions (not shown in FIG. 5) in some embodiments. Resource pools may be implemented within availability zones in some implementations (e.g., each availability zone may have its own reserved resource pool); while in other implementations a resource pool or sub-pool may span multiple availability zones.

Figure 6:
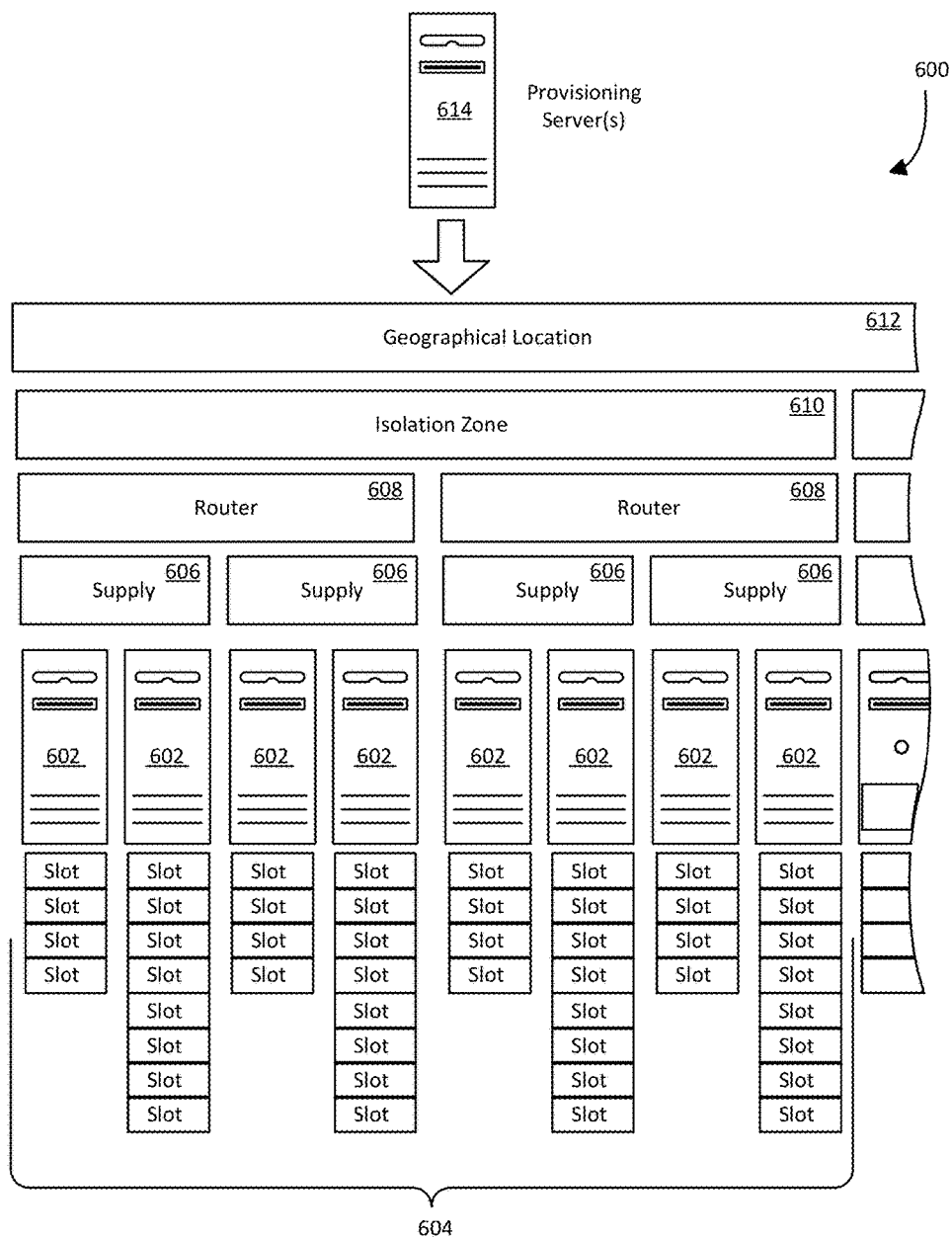
FIG. 6 is a diagram illustrating an example of allocating resources in accordance with the present disclosure.

In some embodiments, such as in FIG. 6, a data center 600 may be viewed as a collection of shared computing resources and/or shared infrastructure. For example, as shown in FIG. 6, a data center 600 may include virtual machine slots 604, physical hosts 602, power supplies 606, routers 608, isolation zones 610, and geographical locations 612. A virtual machine slot 604 may be referred to as a slot or as a resource slot. A physical host 602 may be shared by multiple virtual machine slots 604, each slot 604 being capable of hosting a virtual machine, such as a guest domain. Multiple physical hosts 602 may share a power supply 606, such as a power supply 606 provided on a server rack (not shown). A router 608 may service multiple physical hosts 602 across several power supplies 606 to route network traffic. An isolation zone 610 may service many routers 608, the isolation zone 610 being a group of computing resources that may be serviced by redundant resources, such as a backup generator. Multiple isolation zones 610 may reside at a geographical location 612, such as a data center 600. A provisioning server 614 may include a memory and processor configured with instructions to analyze user data and rank available implementation resources using determined roles and shared resources/infrastructure in the calculation. The provisioning server 614 may also manage workflows for provisioning and deprovisioning computing resources as well as detecting health and/or failure of computing resources.

A provisioning server 614 may determine a placement of the resource within the data center. In some embodiments, this placement may be based at least in part on available computing resources and/or relationships between computing resources. In one embodiment, the distance between resources may be measured by the degree of shared resources. This distance may be used in the ranking of resources according to role. For example, a first system on a host 602 that shares a router 608 with a second system may be more proximate to the second system than to a third system only sharing an isolation zone 610. Depending on an application, it may be desirable to keep the distance low to increase throughput or high to increase durability. In another embodiment, the distance may be defined in terms of unshared resources. For example, two slots 604 sharing a router 608 may have a distance of a physical host 602, and a power supply 606. Each difference in resources may be weighted differently in a distance calculation.

A placement calculation may also be used when selecting a prepared resource to transfer to a client account. In one embodiment, a client requests a virtual machine having an operating system. The provisioning server 614 may determine that the request may be satisfied with a staged volume in a slot 604. A placement decision may be made that determines which infrastructure may be desirable to share and which infrastructure is undesirable to share. Using the placement decision, a staged volume that satisfies at least some of the placement decision characteristics may be selected from a pool of available resources. For example, a pool of staged volumes may be used in a cluster computing setup. When a new volume is requested, a provisioning server 614 may determine that a placement near other existing volumes is desirable for latency concerns. Therefore, the decision may find that sharing a router 608 is desirable but sharing a supply 606 and physical host 602 is undesirable. A volume in the pool may then be selected that matches these attributes and placed preferably on a same router 608 as the other volumes but not the same physical host 602 or power supply 606. In other examples of placement decisions, such as those relating to a database shard, sharing of infrastructure may be less desirable, and a volume may be selected that has less infrastructure in common with other related volumes.

In some embodiments, a pricing optimizer (aspects of whose functionality may be exposed to customers via programmatic interfaces, such as web pages or a website) may be operable to obtain resource usage records of a customer from one or more usage data sources, and determine a recommended course of action for the customer with respect to future resource instance reservations and/or acquisitions based on the usage records and/or other pieces of information. For example, in making the recommendation, the pricing optimizer may take into account data about the customer's resource usage during earlier time periods (e.g., during the last month or the last three months) as indicated by the usage records, the pricing policies, and/or current prices of different types of resources in the various resource pools and one or more optimization goals of the customer. Several different types of customer optimization goals may be taken into account in various embodiments, including, for example, customer budget limits and/or goals for a target number of available resource instances that the customer wishes to acquire. Using these various types of information, the pricing optimizer may determine a recommended number and/or types of resource instances that the customer should access over some future term and provide a notification of the recommendation to the customer.

Various types of usage data sources from which the pricing optimizer obtains usage data to develop its recommendations may be employed in different embodiments. In some embodiments, where, for example, a customer already uses some set of resource instances of the provider network, provider-side metrics agents deployed at various entities (such as resource instances, network devices and the like) within the provider network may serve as usage data sources for the pricing optimizer. The types of usage information collected for a given resource or instance may include, for example, uptime (i.e., the amount of time a resource instance was active or booted up), CPU utilization, memory utilization, I/O rates, I/O device utilization, network traffic rates, network device utilization, the operating system in use, the hypervisor in use, various details of the software stack in use such as application server type and version, and so on, depending on the type of resource. In other embodiments, at least a portion of the usage records may be collected from customer premises or customer networks outside the provider network. For example, in one such embodiment, an entity of the provider network may allow prospective (or current) customers to download installable customer-side metrics agents, which may then be deployed to collect usage statistics from various devices (such as servers, storage devices, or network devices) within the customer's networks. The collected usage data may then be transmitted back for analysis by the pricing optimizer, which may then be able to generate recommendations for the types and number of resource instances the customer should acquire, e.g., to allow the customer to utilize the provider network's resources instead of at least some portion of the customer-side equipment.

The pricing optimizer may in one embodiment also provide recommendations for the target availability zone or zones in which a client's instances should be located. For example, the client's resource usage records may include Internet Protocol (IP) address information that allows the pricing optimizer to determine the sources and destinations of at least some of the client's network traffic, which may be useful in identifying the appropriate availability zones.

In some embodiments, an interface manager (which, as noted earlier, may be incorporated within the pricing optimizer and/or a resource manager or may be external to both the pricing optimizer and resource manager) may implement a programmatic interface, which may, for example, be exposed as one or more web pages, allowing customers to indicate optimization goals that the pricing optimizer should use when developing recommendations. Using such an interface, a customer may, in one implementation, indicate a resource usage budget limit, and the pricing optimizer may attempt to determine recommendations that meet the budget limit. In another scenario, a customer may indicate an instance availability count goal in some embodiments. In environments where different interruptibility settings are supported, e.g., where access to some resource instances may be revoked based on threshold conditions being reached, the pricing optimizer may also receive indications of the interruptibility preferences of a customer and use those preferences in making its recommendations. Various combinations of different types of customer optimization goals may be used in different embodiments. In one implementation the recommendations may include performance capacity ratings for some or all of the resource instances that the customer is being advised to acquire.

In some embodiments a programmatic interface implemented for the customer may allow the customer to specify various "what if" scenarios (such as anticipated or speculative resource usage metrics), and the pricing optimizer may provide recommendations based on these what if scenarios. In one embodiment, a customer may be allowed to use a programmatic interface to opt in to receive notifications if the pricing optimizer is able to find a way for the customer to save a specified amount, and the optimizer may notify the customer accordingly if the desired savings can be implemented. In another embodiment, programmatic interfaces (such as an API) may be implemented to allow third parties, such as network service companies or other intermediaries, to utilize the functionality of the pricing optimizer—e.g., to provide usage data and/or pricing/budgeting goals to the optimizer and receive corresponding recommendations. Third parties may use such facilities to help guide their own customers and/or to build their own resource management interfaces to extend the core functions supported by the pricing optimizer Various other types of services and functions may be provided by the pricing optimizer in different embodiments—e.g., the pricing optimizer may suggest instance downgrades (e.g., informing a customer that they may request a less powerful resource instance than the one they are currently paying for) based on the customer's resource usage statistics, suggest a reservation resale (e.g., recommend to a customer that a long-term reservation should be listed on a reservation resale marketplace), and so on. In one embodiment, the pricing optimizer may be used to provide recommendations for reservations or allocations of execution units (such as CPU-minutes CPU-hours, floating point operations (FLOPs), and the like) instead of, or in addition to, reservations or allocations of entire resource instances.

According to one embodiment, a customer may opt-in to allow a resource manager to automatically implement one or more recommendations made by the pricing optimizer—for example, instead of or in addition to being notified regarding the recommendations. In one such embodiment, the customer may specify a set of resources, such as a set of reserved instances, for which the customer has approved automated recommendation-based actions. (The set of resources may be empty to begin with, i.e., in some cases the customer may utilize the resource manager to obtain all of its resource instances.) Subsequent to an indication of the opt-in by the customer for such automated actions, when the resource manager receives a relevant recommendation generated by the pricing optimizer, at least a portion of the recommendation may be put into effect, e.g., without the customer having to take any additional action. For example, if the recommendation suggests that a particular resource reservation (e.g., a slot for a reserved instance) held by the customer should be listed for resale on a reservations reselling marketplace, the resource manager may list the resource instance or reservation on the marketplace. If and when the listed resource instance is resold (e.g., when a different customer reserves the listed instance), the instance may be removed from the marketplace listing and/or from the set of resources reserved for the customer. In some cases, other events may cause a change in the status of the listed resource instance—e.g., if the instance has been listed for a while and has not yet been resold or if the pricing optimizer generates a new recommendation suggesting that it is advisable to delist the instance from the marketplace (based on pricing changes or increased resource demand from the customer). If the recommendation generated by the pricing optimizer suggests that it is advisable to procure another instance for the customer (e.g., either as a cheaper substitute for a reservation that is being resold or simply because the customer's resource demand is growing), the resource manager may identify an appropriate instance and reserve it or allocate it for the customer's use. The newly reserved or procured instance may be selected from an availability zone or region suggested in the recommendation.

The resource manager responsible for automating reservation modifications and/or other actions in accordance with recommendations generated by the pricing optimizer may be responsible for several other related functions in some embodiments. For example, the resource manager may implement one or more programmatic interfaces (such as web pages, APIs, or command-line interfaces) allowing customers to opt in for the automated implementation of the optimizer's recommendations, as well as one or more of the programmatic interfaces similar to those described above implementing aspects of the pricing optimizer functionality. A programmatic interface allowing customers to specify budget constraints, availability zone preferences, and the like, to be used by the pricing optimizer in generating recommendations may be implemented by the resource manager in one embodiment. In some implementations the resource manager may provide an interface that allows a customer to specify a schedule for automated reservation optimization attempts. The customer may also indicate a scheduling preference that allows the resource manager and the pricing optimizer to control when recommendations are generated and/or implemented in some implementations—i.e., a scheduling preference that provides full flexibility for the timing of recommendation generation and implementation. In some embodiments, the full flexibility option may represent the default behavior of the system, such that restrictions on the timing of the actions of the optimizer and the resource manager may only be imposed in response to specific demands from the customer. Scheduling preferences may be communicated to the pricing optimizer by the resource manager, and the recommendations may be generated in accordance with the preferences.

Operators of provider networks, such as those described above, may, in some embodiments, provide an infrastructure, such as resource management service 280 depicted in FIG. 2, configured to provide customers with the ability to submit and manage requests or bids for computing resources such as instances. A request may be a request for computing resources that does not specify one or more parameters that may typically be provided with a request for computing resources from the provider network. For example, a request may not include a reservation mode, such as whether the request is for a transient instance or a reserved instance. The request may also not include the quantity of instances or a particular instance size or capacity. In one embodiment, a customer may be able to submit a request that includes an arbitrary number of parameters that are abstracted above the technical specifications of the discrete resource slots or units that are implemented by the provider network. The customer can therefore submit requests for computing resources in terms of parameters that are more relevant to the customer's applications and services. The provider network may translate the parameters included in the request to the provider network's discrete computing resource slots or units in a way that fulfills the customer's request within any constraints requested by the customer, such as a maximum total price or price rate.

Figure 7:
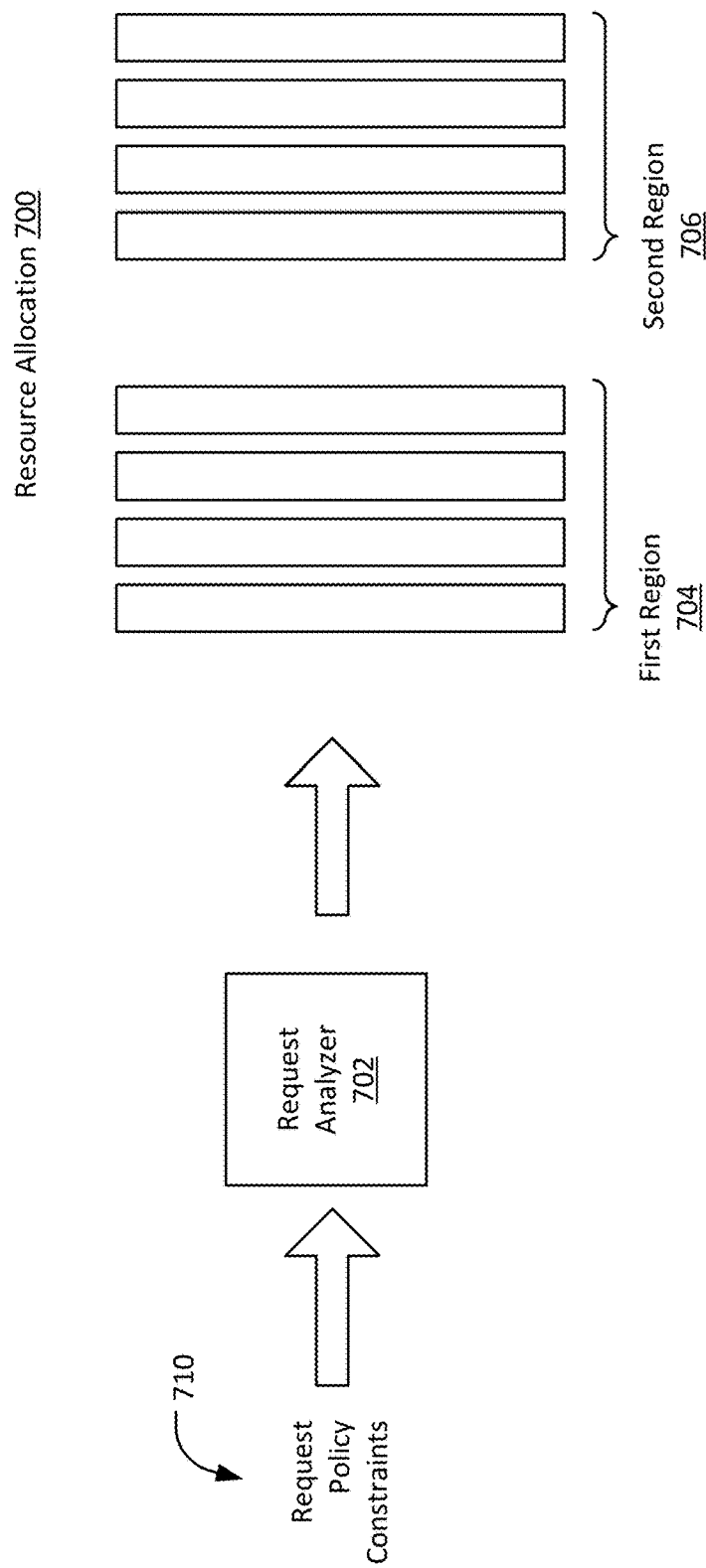
FIG. 7 is a diagram illustrating a system for allocating resources in accordance with the present disclosure.

Referring to FIG. 7, illustrated is an example of providing resources in accordance with this disclosure. Referring to FIG. 7, a provider network (not shown) may implement a resource allocation 700 that may represent planning for an allocation of computing resource slots at a current or future time. A provider network may maintain a plurality of such resource allocations for different times and locations. Resource allocation 700, in this example, may include allocations for a first region 704 and allocations for a second region 706. A resource management service 280 in FIG. 2 implemented by a provider network may include a request analyzer 702. The request analyzer 702 may access data including a request provided by a customer. The request analyzer 702 may also access a configuration file that may be provided by the customer or by the provider network. The configuration file may include information usable for translating the request to resources that can be allocated by the provider network. The request analyzer 702 may access one or more policies that may define additional objectives and policies for fulfilling the request. The request analyzer 702 may also access constraints provided by the customer for fulfilling the request, such as a maximum price that the customer is willing to pay. In one embodiment, the resource management service 280 can be embodied in software that can be installed on a network of computers in the provider network.

Utilizing the technologies described above, a provider network may implement the resource management service 280 to allow customers to request and acquire computing resources. As discussed above, a customer may submit a request for resources without specifying a particular quantity of instances or their configuration. The request can be represented as an abstraction without specifying one or more details, such as the number of instances, the reservation mode (e.g., transient, reserved, or on-demand), the instance size, the number of processors, the amount of memory, and the like. For example, the request or bid may comprise a desired computing capability, such as a number of compute units. In some embodiments, customers may submit a single request to provision an unspecified quantity of an instance type by specifying a particular type of end service, such as media transcoding or parallel computing. The request or bid may also include a desired pricing level that the customer is willing to pay to fulfill the request or bid. Customers may provide other parameters to further describe the customer's computing needs and to further optimize fulfillment of the request or bid. In this way, a customer need not analyze the customer's computing needs in terms of specific configurations of the provider network's available instances and estimate a particular configuration or quantity of instances.

In one embodiment, a customer may bid a desired price for computing capacity by bidding on instances without specifying a particular size or capacity of the instance. The provider network may provide available transient instances when the customer's bid exceeds the current transient price. Thus, for example, a customer requesting a large amount of transient instance capacity need not submit multiple transient requests for different instance types and bid prices to achieve their target capacity. Customers requesting hundreds or thousands of instances may find it difficult to track and manage such a large number of transient requests. By using a resource management service, a customer can submit a single request for an aggregate target capacity without identifying parameters, such as an instance type, a platform, or an availability zone. The customer may also submit a bid price that represents a maximum price that the customer is willing to pay per capacity unit or other unit of measure.

In addition to the quantity of instances, a customer may request capacity in terms of any unit of measure, such as a quantity of computing cores, discrete compute units, memory, or a custom metric. When the request is submitted, the provider network can process the request to fulfill the request using one or more instances. In an embodiment, the customer may be able to monitor and managed the request via a user interface or API.

By providing such a resource distribution framework for requesting or bidding for resources, the provider network can provide the resources by efficiently fulfilling the customer's request using available resources that meet the customer's requirements. This can allow the provider network to more efficiently allocate its resources while allowing the customer to more easily maximize their computing capacity and lower the prices that the customer pays for the computing capacity. For example, customers with distributed computing needs may be able to run applications on hundreds or thousands transient instances by submitting a single request. Some customers may not need a specific instance type and may be more concerned with maximizing the number of cores and minimizing the price per core. By using such a resource management service, a customer can avoid the need to continuously adjust instance types and bid prices to obtain a desired computational throughput at a desired price rate. The customer may instead, using the resource management service, submit a single request that specifies a target core count and a maximum bid price per core-hour. The provider network can then automatically process the request to maximize the running core count while remaining within the bid price. In some cases, a customer who is interested in batch processing architectures that are scalable may be able to tolerate interruptions. By allowing the provider network to flexibly provide available transient and other instances, such a customer may be able to maximize the amount of computing capacity for a given cost constraint without the need to constantly monitor numbers and types of instances.

In one embodiment, a customer may submit a single request that does not specify an instance type and may include an aggregate capacity level measured in one or more capacity units. The capacity units may be user specified or defined by the provider network. Some examples of such a request may include instance types if desired, but may also include cores, computing units and memory (e.g., numbers of gigabytes or other measures).

As discussed above, a provider network may allow customers to rent or lease computing capacity in units of time. Because a provider network may utilize commodity hardware, over time there may be several different types of physical hardware underlying computing instances. In an embodiment, the provider network may use a variety of measures to define a consistent amount of CPU capacity that is independent of the actual underlying hardware and can provide each instance with a consistent and predictable amount of CPU capacity. In order to allow for comparison of CPU capacity between different instance types, the provider network may, in some embodiments, define a standard unit of computing capacity that is used herein as "compute unit" or "computing unit." The amount of CPU capacity that is allocated to a particular instance may then be expressed in terms of computing units or compute units. The provider network may use a number of benchmarks and/or tests to manage the consistency and predictability of the performance of a computing unit or compute unit. For example, a compute unit may be defined to provide the equivalent CPU capacity of a particular commodity processor. The provider network may add or substitute measures for defining a compute unit or a computing unit.

In one embodiment, a customer submitting a request may specify a target capacity in one or more capacity units and a maximum bid price per capacity unit. Additional information provided by the customer can include a request name or identifier, as well as additional information if the customer has specific preferences, such as the number of cores, computing units, memory, one or more instance types that the customer wants to run, the availability zone, bid type (e.g., one-time or persistent), and any other available parameters that the customer specifies. The customer may also access information regarding the request and may view, for example, aggregate metrics regarding the customer's request, such as a total running capacity or cumulative computing costs. The customer may also be able to perform actions, such as modify or cancel the request.

The provider network may receive the parameters in the request, process the request, and fulfill the request. The provider network may fulfill the request based at least on the parameters associated with the request and available computing resources such as available instances. For example, the provider network may attempt to achieve the requested target capacity by bidding on transient instances with the lowest price per capacity unit. For one-time requests, the provider network may place one round of bids; and for persistent bids, the provider network may continuously place bids as necessary to provision the target capacity.

To provide an illustrative example, a customer may submit a request for a target capacity of 1,000 computing units and a maximum bid price of $0.05 per computing unit. The provider network may attempt to launch up to 1,000 computing units of computing capacity across different instance types and availability zones. The provider network may attempt to obtain capacity with transient instances with the lowest current transient prices. If the request is persistent, the provider network may continuously try to maintain the requested target capacity of 1,000 computing units and may bid on more transient instances whenever less than 1,000 computing units are running.

The provider network may identify the request with a single request identifier, allowing customers to manage a batch request as a single operation rather than having to manage individual bids for multiple instances. Furthermore, a batch request may be monitored with aggregated metrics for the batch, such as how much of the target capacity is running and how much the batch request has cost to date. Customers may also conduct batch actions, such as terminating the entire request.

In some embodiments, the request can specify the desired task or capability using a customized set of parameters. In one embodiment, the customized parameters may be based on a computing capacity measure that is selected by the customer. The provider network may process these parameters and determine a number and types of instances that can be used to fulfill the request. In some embodiments, the customer may select one or more conversion parameters that may be used to determine the number and type of instances for fulfilling the request. The provider network may additionally or alternatively determine the one or more conversion parameters. In one embodiment, the conversion parameters may comprise a set of weights that can be used to determine computing capabilities and requirements. In some embodiments, a configuration file may be provided by the customer that can be used for converting the request by the provider network.

Any number of custom parameters may be used as part of a request. For example, the request may include specification of graphics processing capabilities, maximum memory capacity, bandwidth, need-by date, start date, number of user connections, and cumulative rate. In some embodiments, the custom parameters may be related to a particular application. For example, a parameter for any program at the application layer may be used as a custom parameter. In this way, arbitrary customer defined parameters may be used to request computing resources without the customer having to determine a specific number of type of instance. The provider network may process the customer's request and determine the most cost effective way to fulfill the request based on the available resources. For example, the provider network may allocate a mix of reserved instances and transient instances if a certain amount of guaranteed computing capability is required. However, if low cost is heavily weighted and interruptibility is not a concern, then the provider network may decide to only bid for transient instances in order to minimize cost. In some embodiments, a customer's allocated resources may be started and suspended to avoid higher demand (and thus higher priced) time slots.

The provider network may use the information from requests to plan for future capacity. The provider network may also more efficiently utilize spare assets. Since a request does not specify a particular resource, the provider network may be able to allocate underutilized resources that would not otherwise have been requested by the customer.

The provider network may process a request using one or more processes for determining how to fulfill the request using the specified constraints. One example of such a process may comprise submitting a bid to fulfill the entire request using the lowest-priced transient instance pool. If the request includes an acceptable interruptibility level (e.g., every 30 minutes), the provider network may make adjustments every 30 minutes as necessary to obtain lower pricing if available. Allocated computing resources may be reallocated, and bid prices may be adjusted as necessary to continue fulfillment of the customer's request. The provider network may also allocate resources in pools with the most spare capacity to minimize interruptions. If the customer requests a portion of the capacity to be free from interruptions, then a portion of computing capacity may be provided using reserved instances or on-demand instances to guarantee that the portion will not be interrupted.

In some embodiments, a pricing optimizer as described above may be used to evaluate a customer's usage and task completions and re-evaluate weights. Such a pricing optimizer can measure task flow rates and provide recommendations for lowering cost.

The provider network may provide a scheduler component that can determine estimates for request fulfillment. In one embodiment, a projected total price or rate can be estimated and offered to the customer in response to the request. In some embodiments the offered price can be guaranteed even if the actual price exceeds the estimated price. The provider network may also provide alternative prices for different parameters. For example, an estimate may be provided for the customer's original request, and additional price estimates may be provided showing that the customer may lower costs by modifying a requested parameter, such as a need-by date.

Figure 8:
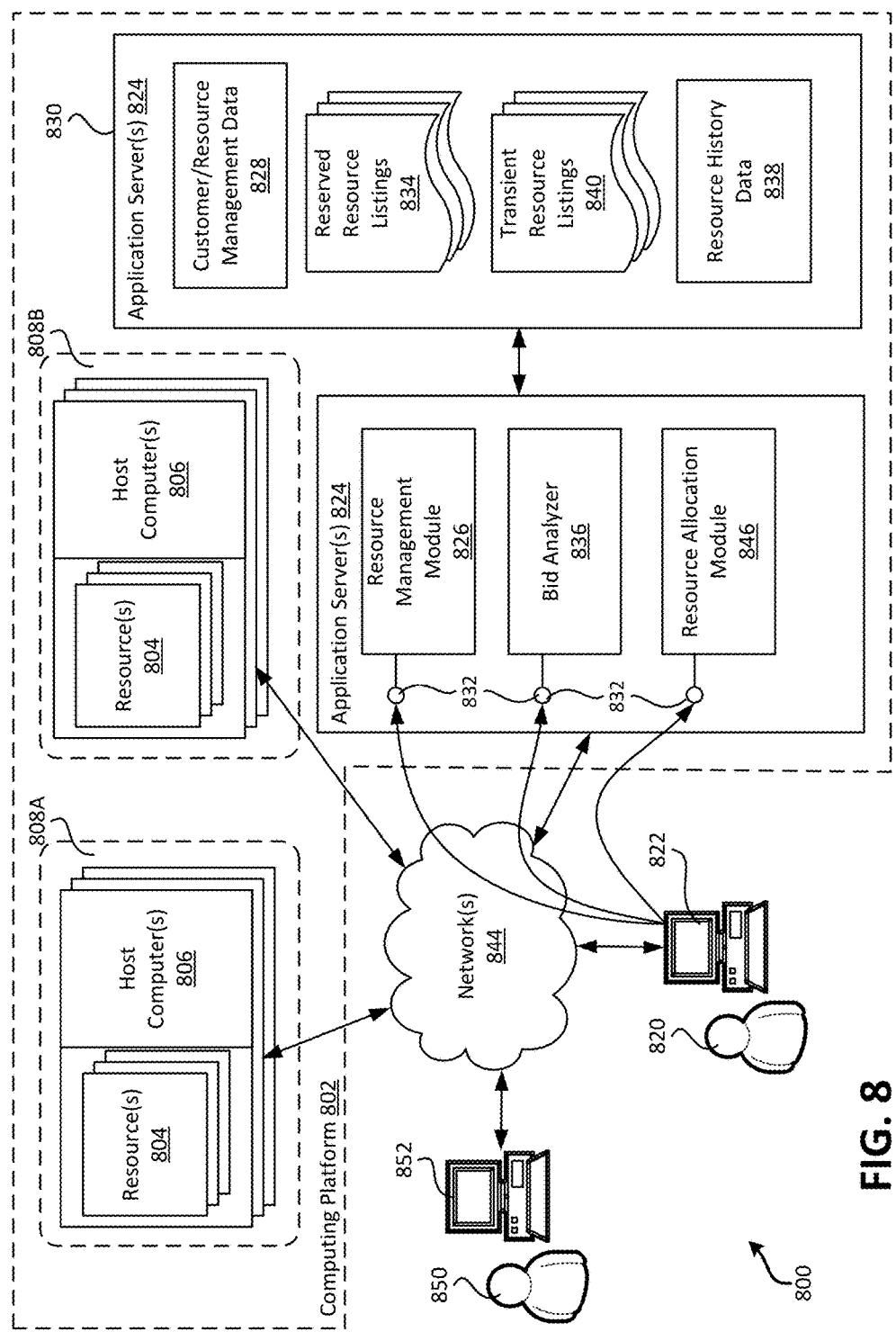
FIG. 8 is a diagram illustrating a system for allocating resources in accordance with the present disclosure.

FIG. 8 is a system diagram that shows an illustrative operating environment 800 including several components for implementing a resource management service. The environment 800 may include a computing platform 802. The computing platform 802 may be implemented by a computing resource provider to make computing resources available to a customer 820 for the deployment and execution of distributed applications.

The computing resources provided by the computing platform 802 may include various classes of resources, such as data processing resources, data storage resources, data communication resources, and the like. Each class of computing resource may be general-purpose or may be available in a number of specific configurations. For example, data processing resources provided by the computing resource provider may be made available in discrete units or resources 804. Each resource 804 may represent the data processing resources of a dedicated host computer 806, referred to herein as a dedicated tenancy resource, or each resource 804 may represent a virtual machine resource executing on a host computer 806, which may also be referred to as a shared tenancy resource.

The host computers 806 may represent generic multi-processor server devices, special-purpose hardware devices, and the like. As discussed above, various types and configurations of resources 804 may be made available. For example, each available resource 804 of data processing resources may be of a particular size—such as small, medium, and large—representing different combinations of physical and/or virtual resources comprising or allocated to the resource, such as number and types of processors, amounts of memory, size and speed of local storage, number of networking addresses or communication channels, and/or the like. A resource 804 may further be configured with a particular platform, such as a specific OS and/or hypervisor installed on the resource. Resources 804 may also be made available with specific application software components installed, such as web server software, database management software, portal software, a specific runtime environment or platform, and the like.

Resources may further be available in specific availability zones 808A and 808B, as described above and which may be referred herein singularly as "an availability zone 808" or in the plural as "the availability zones 808"). As discussed above, an availability zone 808 may represent a particular physical location, such as a data center or other physical and/or logical grouping of underlying host computers 806 and computing devices supporting the resources 804 provided by the computing platform 802. Providing resources 804 in different sizes and in different availability zones 808 may allow a deployed application to be geographically dispersed, improving end-user performance and insulating the overall application from failures in one particular location or zone. For example, a customer 820 may choose to deploy a number of small resources 804 across multiple availability zones 808 for some functions of the application, such as web servers, while deploying a single large resource 804 for other functions, such as a database server, for example. The customer 820 may also require that resources 804 be hosted by host computers 806 in particular geographical locations for geopolitical reasons as well.

End-users 850 may utilize end-user computer systems 852 to access the functionality of the application executing on the allocated resources 804 through one or more networks 844. The network(s) 844 may represent a combination of local-area networks (LANs), wide-area networks (WANs), the Internet, and/or any other networking infrastructure known in the art that connects the host computers 806 in the computing platform 802 to the end-user computer systems 852 to each other and to other computing resources. The end-user computer systems 852 may represent personal computers (PCs), desktop workstations, laptops, notebooks, personal digital assistants (PDAs), electronic-book readers, game consoles, set-top boxes, consumer electronics devices, server computers, or any other computing device capable of connecting to the network(s) 844 and communicating with the host computers 806 in the computing platform 802.

A customer 820 wishing to access resources on the computing platform 802 may similarly utilize a customer computer system 822 to connect the computing platform over the network(s) 844 and to configure and manage the computing resources provided by the computing platform. In this regard, the computing platform 802 may include a number of application servers 824 that provide various management services to the customer 820 for purchasing and maintaining resources 804 of data processing and/or other computing resources, deploying components of the application across the purchased resources 804, monitoring and administering execution of the application, and the like. As in the case of the end-user computer systems 852, the customer computer systems 822 may represent PCs, desktop workstations, laptops, notebooks, PDAs, electronic-book readers, game consoles, set-top boxes, consumer electronics devices, server computers, or any other computing device capable of connecting to the network(s) 844 and communicating with the application servers 824 in the computing platform 802.

The application servers 824 may represent standard server computers, database servers, web servers, network appliances, desktop computers, other computing devices, and any combination thereof. The application servers 824 may execute a number of modules in order to provide the management services. The modules may execute on a single application server 824 or in parallel across multiple application servers in the computing platform 802. In addition, each module may consist of a number of subcomponents executing on different application servers 824 or other computing devices in the computing platform 802. The modules may be implemented as software, hardware, or any combination of the two.

The application servers 824 may execute a resource management module 826. The resource management module 826 may allow customers 820 to purchase and configure resources 804 of data processing or other computing resources, manage and maintain purchased resources 804, and the like. Resources 804 may include resources that may be obtained through various modes, such as reserved resources, transient resources, and on-demand resources as described above. Purchased resources 804 for each customer 820 and corresponding configuration and status information may be stored in customer/resource management data 828. The customer/resource management data 828 may be stored in a database 830 or other data storage system available to the application server(s) 824 in the computing platform 802.

Reserved resources provide the customer 820 with the ability to reserve a number of a specific type and configuration of resources for a term, such as one year or three years. The reserved resources may represent actual resources of data processing resources configured as specified and placed in stand-by for launch and deployment by the customer 820 at a future time, or the reserved resources 804 may represent overall capacity reserved by the computing resource provider for quick configuration and launch when required. When deploying an application, a customer 820 may purchase and launch a number of on-demand resources 804 of a specific type and configuration (e.g., size, platform, tenancy, availability zone, and the like) to support immediate availability of the application, as well as a number of reserved resources of the same or similar type and configuration for scaling up the application in the future in response to increased demand or capacity requirements of the application, for example.

A customer 820 may utilize a web browser application executing on the customer computer system 822 to access a user interface presented by the resource management module 826 through a web service to perform the configuration and maintenance of the customer's purchased resources 804. The customer 820 may also utilize a web browser application executing on the customer computer system 822 to access a user interface presented by the resource allocation module 846 through a web service to allocate slave and master resources as discussed above. Additionally or alternatively, the resource management module 826 or resource allocation module 846 may expose an application programming interface (API) 832, which may be accessed over the network(s) 844 by stand-alone application programs executing on the customer computer system 822. Other mechanisms for accessing the configuration and maintenance services of the resource management module 826 or resource allocation module 846 may also be imagined, including remote procedure calls, SOAP-based web services, remote file access, proprietary client-server architectures, and the like.

In some embodiments, the resource management module 826 may allow customers 820 to purchase both on-demand resources and reserved resources. On-demand resources may be purchased and launched immediately, allowing for quick deployment of the components of the application. On-demand resources may further be added or removed as needed, either manually or automatically through auto scaling, as demand for or capacity requirements of the application changes over time. The customer 820 may incur ongoing usage costs related to their on-demand resources, based on the number of hours of operation of the resources 804 and/or the actual resources utilized, for example.

A customer 820 may determine that in addition to the customer's purchased resources 804, the customer 820 may want to purchase computing capacity at a fixed rate and without having to determine a specific quantity of any resource. For example, the computation needs of the customer 820 may be predictable, and the customer may wish to acquire additional computing capacity to fulfill the computation needs at a not-to-exceed price. The customer 820 may submit a request that includes one or more parameters sufficient for bid analyzer 836 to determine an estimated quantity or quantities and type(s) of resource that will fulfill the customer's computation needs.

The bid analyzer 836 may access the reserved resource listings 834 and transient resource listings 840 in the database 830 to determine availability and pricing data for the estimated quantity and type(s) of resource that will fulfill the customer's computation needs. For example, bid analyzer 836 may determine resource type and configuration requirements (e.g., size, platform, tenancy, availability zone, and the like).

The application servers 824 may execute a resource allocation module 846. The resource allocation module 846 may facilitate the allocation of the resources determined by bid analyzer 836. The resource allocation module 846 may allow also customer 820 to view status of the customer's bids. The customer 820 may utilize a web browser application executing on the customer computer system 822 to access a user interfaces (UI) presented by the resource allocation module 846 through a web service to browse for pending bids and make changes. Additionally or alternatively, the resource allocation module 846 may expose an API 832, which may be accessed over the network(s) 844 by stand-alone application programs executing on the customer computer system 822.

The resource allocation module 846 may further store data records regarding submitted and fulfilled bids in the resource history data 838 in the database 830 or other data storage system. The resource history data 838 may be utilized by customer 820 or the computing resource provider to record billing data regarding fulfilled bids.

As discussed, the user can be provided a user interface for submitting a request. For example, the user may be able to access a user interface, such as the one shown in FIG. 8. In one embodiment, a customer may utilize a user interface presented by the resource allocation module 846 of FIG. 8 to submit a request. For example, as shown in FIG. 9, the resource allocation module 846 or another module in the computing platform 802 may present the user interface 900 to the customer 820 in a window 902 of a web browser or other client application executing on the customer computer system 822. The user interface 900 may include a template for creating/submitting a new request form 904 listing the parameters of a request that the user may submit. The request form 904 may include a request name 906, resource type (if desired) 908, master/slave configuration 909, quantity and type of parameters 910, and the like. The user interface 900 may also provide typical or average prices 912 that may be relevant to the customer's request. Based on the customer's currently entered parameters, the user interface 900 may provide an estimated current price range 914 for fulfilling the customer's request based on currently entered parameters and currently available prices. These fields are provided to illustrate examples of possible user interface options that may be provided to a customer. As further described herein, additional fields may be provided, and some of the fields may be optional.

The user interface 900 may further include a selection user interface control, such as the user interface control 916 shown in FIG. 9 that allows the customer 820 to proceed with the currently entered parameters.

In some embodiments, an API may be provided for facilitating the submission of requests. The API may be configured to receive electronic messages that encode identifiers indicative of request for fulfillment by the provider network. In response to receiving one of the electronic messages, the API may send second electronic messages indicative of information indicating that a request has been received or has been allocated to the customer. An API may also be provided that can facilitate exchange of data with applications that may provide information for submitting requests. For example, an API may receive parameter data from third-party applications that may perform customer scheduling and task management functions.

In additional embodiments, the resource management module 826 or other modules in the computing platform 802 may provide user interfaces or APIs 832 to the customer 820 and/or customer computer system 822 that allow the customer to modify their request, check the status of the request record, and/or to delete the request record if it is no longer desired to provide the computing capacity using the resource management service.

Figure 10:
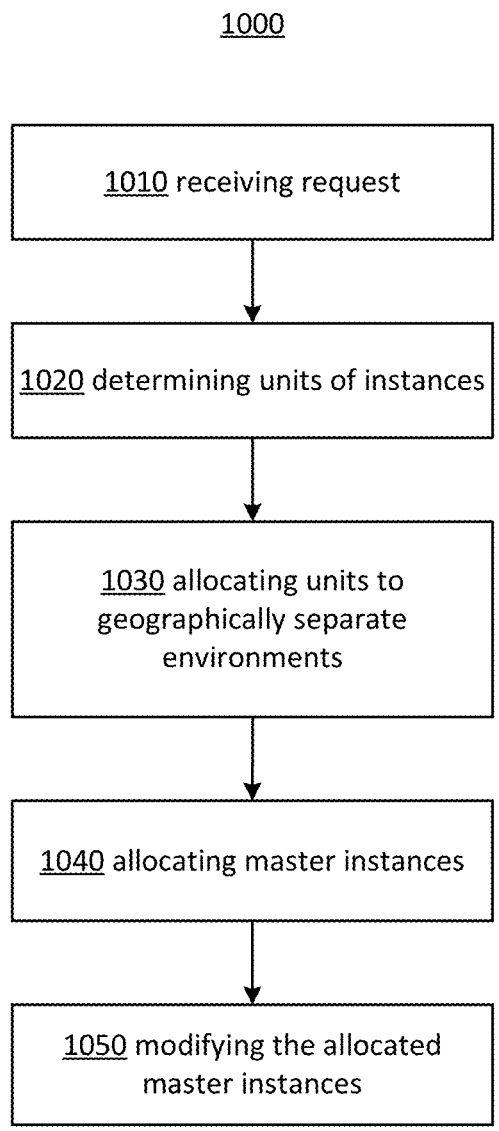
FIG. 10 is a flowchart depicting an example procedure for allocating resources in accordance with the present disclosure.

An example procedure 1000 for allocating resources is illustrated in FIG. 10. In an embodiment, a mechanism for allocating computing resources can be provided by services, such as resource management service 280 in FIG. 2. The operational procedure may be implemented in a system comprising one or more computing devices. In one embodiment, the system may comprise a data center. The one or more computing devices may comprise a plurality of resource slots, each resource slot configured to host a computing instance. Referring to FIG. 10, operation 1000 begins the operational procedure. Operation 1010 illustrates receiving, from one of a plurality of entities, a request comprising one or more parameters indicative of a computing use and at least one criterion for fulfilling the computing use. In an embodiment, the request does not specify a quantity of units of computing instances for fulfilling the computing use. Operation 1020 illustrates determining a quantity of units of computing instances sufficient to fulfill the computing use in accordance with the at least one criterion. Operation 1030 illustrates allocating the quantity of the units of computing instances to a plurality of geographically separate computing environments. Operation 1040 illustrates allocating a ratio of master computing instances to the allocated units of computing instances based on the at least one criterion. Operation 1050 illustrates modifying the allocated master computing instances as the allocated units of computing instances are redistributed over the plurality of geographically separate computing environments.

Each of the processes, methods, and algorithms described in the preceding sections may be embodied in, and fully or partially automated by, code modules executed by one or more computers or computer processors. The code modules may be stored on any type of non-transitory computer-readable medium or computer storage device, such as hard drives, solid state memory, optical disc, and/or the like. The processes and algorithms may be implemented partially or wholly in application-specific circuitry. The results of the disclosed processes and process steps may be stored, persistently or otherwise, in any type of non-transitory computer storage, such as, e.g., volatile or non-volatile storage.

The various features and processes described above may be used independently of one another, or may be combined in various ways. All possible combinations and subcombinations are intended to fall within the scope of this disclosure. In addition, certain method or process blocks may be omitted in some implementations. The methods and processes described herein are also not limited to any particular sequence, and the blocks or states relating thereto can be performed in other sequences that are appropriate. For example, described blocks or states may be performed in an order other than that specifically disclosed, or multiple blocks or states may be combined in a single block or state. The example blocks or states may be performed in serial, in parallel, or in some other manner. Blocks or states may be added to or removed from the disclosed example embodiments. The example systems and components described herein may be configured differently than described. For example, elements may be added to, removed from, or rearranged compared to the disclosed example embodiments.

It will also be appreciated that various items are illustrated as being stored in memory or on storage while being used, and that these items or portions of thereof may be transferred between memory and other storage devices for purposes of memory management and data integrity. Alternatively, in other embodiments some or all of the software modules and/or systems may execute in memory on another device and communicate with the illustrated computing systems via inter-computer communication. Furthermore, in some embodiments, some or all of the systems and/or modules may be implemented or provided in other ways, such as at least partially in firmware and/or hardware, including, but not limited to, one or more application-specific integrated circuits (ASICs), standard integrated circuits, controllers (e.g., by executing appropriate instructions, and including microcontrollers and/or embedded controllers), field-programmable gate arrays (FPGAs), complex programmable logic devices (CPLDs), etc. Some or all of the modules, systems and data structures may also be stored (e.g., as software instructions or structured data) on a computer-readable medium, such as a hard disk, a memory, a network, or a portable media article to be read by an appropriate drive or via an appropriate connection. The systems, modules and data structures may also be transmitted as generated data signals (e.g., as part of a carrier wave or other analog or digital propagated signal) on a variety of computer-readable transmission media, including wireless-based and wired/cable-based media, and may take a variety of forms (e.g., as part of a single or multiplexed analog signal, or as multiple discrete digital packets or frames). Such computer program products may also take other forms in other embodiments. Accordingly, the present invention may be practiced with other computer system configurations.

Conditional language used herein, such as, among others, "can," "could," "might," "may," "e.g.," and the like, unless specifically stated otherwise, or otherwise understood within the context as used, is generally intended to convey that certain embodiments include, while other embodiments do not include, certain features, elements, and/or steps. Thus, such conditional language is not generally intended to imply that features, elements, and/or steps are in any way required for one or more embodiments or that one or more embodiments necessarily include logic for deciding, with or without author input or prompting, whether these features, elements, and/or steps are included or are to be performed in any particular embodiment. The terms "comprising," "including," "having," and the like are synonymous and are used inclusively, in an open-ended fashion, and do not exclude additional elements, features, acts, operations, and so forth. Also, the term "or" is used in its inclusive sense (and not in its exclusive sense) so that when used, for example, to connect a list of elements, the term "or" means one, some, or all of the elements in the list.

While certain example embodiments have been described, these embodiments have been presented by way of example only, and are not intended to limit the scope of the inventions disclosed herein. Thus, nothing in the foregoing description is intended to imply that any particular feature, characteristic, step, module, or block is necessary or indispensable. Indeed, the novel methods and systems described herein may be embodied in a variety of other forms; furthermore, various omissions, substitutions, and changes in the form of the methods and systems described herein may be made without departing from the spirit of the inventions disclosed herein. The accompanying claims and their equivalents are intended to cover such forms or modifications as would fall within the scope and spirit of certain of the inventions disclosed herein.

What is claimed is:

1. A system configured to allocate computing resources to customers of a multi-tenant web services platform, the system comprising:
   at least one memory having stored therein computer instructions that, upon execution by one or more processors of the system, at least cause the system to:
      receive, from one of a plurality of entities, a request comprising one or more parameters indicative of a computing use and at least one criterion for fulfilling the computing use without requiring specification of a quantity of units of computing instances for fulfilling the computing use;
      determine a quantity of first units of computing instances sufficient to fulfill the computing use in accordance with the at least one criterion;
      allocate the quantity of the first units of computing instances to a plurality of geographically separate computing environments as allocated units of computing instances;
      allocate a ratio of master computing instances to the allocated units of computing instances based on the at least one criterion, wherein two or more of the master computing instances are allocated to a first one of the plurality of geographically separate computing environments, and wherein the two or more of the master computing instances manage two or more of the allocated units of computing instances within the first one of the plurality of geographically separate computing environments; and
      modify the master computing instances as the allocated units of computing instances are redistributed over the plurality of geographically separate computing environments.

2. The system according to claim 1, wherein the computing use comprises one or more of a distributed application and a computing resource parameter.

3. The system according to claim 1, wherein the at least one criterion is indicative of a price associated with interruptibility of the computing use.

4. In a computing environment comprising a plurality of computing devices having capacity that is logically segmented into first resource slots of a plurality of resource types, wherein the first resource slots are configured to be associated with at least one of a plurality of entities, a method comprising:
   receiving, from at least one entity of the plurality of entities, a request to fulfill a computational task and at least one constraint for fulfilling the computational task, the request being independent of a specified quantity or type of resource slot to fulfill the computation task;
   determining, by one or more processors of a computing system, a quantity or type of the first resource slots sufficient to fulfill the request in accordance with the at least one constraint;
   allocating, by the one or more processors of the computing system, the determined quantity or type of the first resource slots to a plurality of geographically separate computing environments as allocated resource slots; and
   allocating, by the one or more processors of the computing system, master resource slots in the plurality of geographically separate computing environments based on the at least one constraint and the quantity or type, wherein two or more of the master resource slots are allocated to a first one of the plurality of geographically separate computing environments, and wherein the two or more of the master resource slots manage two or more of the allocated resource slots within the first one of the plurality of geographically separate computing environments.

5. The method of claim 4, wherein the at least one constraint is defined by the at least one entity.

6. The method of claim 4, wherein the at least one constraint is a selectable template.

7. The method of claim 4, wherein the allocating the master resource slots comprises determining if a geographically separate computing environment has a preexisting allocated master resource slot.

8. The method of claim 4, wherein the master resource slots are stable computing instances and the allocated resource slots are interruptible computing instances.

9. The method of claim 4, wherein the computational task comprises an application layer task, and the determining comprises calculating a quantity and type of resource slot to fulfill the application layer task.

10. The method of claim 4, wherein the type of resource slot comprises an instance wherein the instance comprises one of a transient instance, a reserved instance, and an on-demand instance.

11. The method of claim 4, wherein the at least one constraint comprises at least one of a maximum price per unit of computing capacity, a maximum total price of total units of computing capacity, or a maximum total price for fulfillment of the request.

12. The method of claim 4, wherein changes to the allocated resources slots are determined based on cost thresholds.

13. The method of claim 4, wherein the computational task comprises a distributed computing task that is distributed among the allocated resource slots in the plurality of geographically separate computing environments.

14. The method of claim 4, wherein the allocated resource slots are allocated to the at least one entity while a maximum billing price assigned to the at least one entity exceeds a market-based price level for the allocated resource slots.

15. The method of claim 4, wherein the allocated resource slots and master resource slots are allocated based in part on data transfer requirements between computing environments.

16. The method of claim 4, wherein a ratio of determined resource slots and master resource slots is selectable by the at least one entity.

17. The method of claim 4, wherein a configuration of the allocated resource slots and master resource slots are selectable by the at least one entity.

18. The method of claim 4, further comprising reallocating the master resource slots based on changes to the allocated resources slots.

19. A method for allocating computing resources to customers of a multi-tenant web services platform, the method comprising:
   receiving, from one of a plurality of entities, a request comprising one or more parameters indicative of a computing use and at least one criterion for fulfilling the computing use without requiring specification of a quantity of units of computing instances for fulfilling the computing use;
   determining a quantity of first units of computing instances sufficient to fulfill the computing use in accordance with the at least one criterion;
   allocating the quantity of the first units of computing instances to a plurality of geographically separate computing environments as allocated units of computing instances;
   allocating a ratio of master computing instances to the allocated units of computing instances based on the at least one criterion, wherein two or more of the master computing instances are allocated to a first one of the plurality of geographically separate computing environments, and wherein the two or more of the master computing instances manage two or more of the allocated units of computing instances within the first one of the plurality of geographically separate computing environments; and
   modifying the master computing instances as the allocated units of computing instances are redistributed over the plurality of geographically separate computing environments.

20. The method according to claim 19, wherein the computing use comprises one or more of a distributed application and a computing resource parameter.

* * * * *